US010848968B2

(12) United States Patent
Shin et al.

(10) Patent No.: US 10,848,968 B2
(45) Date of Patent: Nov. 24, 2020

(54) ADAPTIVE TYPE BEACON CIGAR JACK DEVICE

(71) Applicant: OWIN INC., Seoul (KR)

(72) Inventors: Sung-Chul Shin, Seoul (KR); Do-Kuen Jung, Seoul (KR); Jae-Hyung Kim, Seoul (KR)

(73) Assignee: OWIN INC., Seoul (KR)

( * ) Notice: Subject to any disclaimer, the term of this patent is extended or adjusted under 35 U.S.C. 154(b) by 228 days.

(21) Appl. No.: 15/561,974

(22) PCT Filed: Nov. 6, 2015

(86) PCT No.: PCT/KR2015/011946
§ 371 (c)(1),
(2) Date: Sep. 26, 2017

(87) PCT Pub. No.: WO2016/159474
PCT Pub. Date: Oct. 6, 2016

(65) Prior Publication Data
US 2018/0118076 A1  May 3, 2018

(30) Foreign Application Priority Data

Mar. 27, 2015 (KR) .................. 10-2015-0042971

(51) Int. Cl.
*B60N 3/14* (2006.01)
*H02J 7/00* (2006.01)
*H04W 12/06* (2009.01)

(52) U.S. Cl.
CPC .............. *H04W 12/06* (2013.01); *B60N 3/14* (2013.01)

(58) Field of Classification Search
CPC ............. B60R 11/0247; B60R 11/0264; B60R 2011/0054; B60R 2011/0089; G06Q 30/02; G06Q 30/0207
See application file for complete search history.

(56) References Cited

U.S. PATENT DOCUMENTS

| 2004/0063472 A1* | 4/2004 | Shimizu | H04M 1/6083 |
| | | | 455/569.1 |
| 2005/0046584 A1* | 3/2005 | Breed | B60N 2/0232 |
| | | | 340/13.31 |

(Continued)

FOREIGN PATENT DOCUMENTS

| JP | 2004-192550 | 7/2004 |
| JP | 2004-240918 | 8/2004 |

(Continued)

OTHER PUBLICATIONS

International Search Report for PCT/KR2015/011946 dated Feb. 18, 2016 and its English translation from WIPO.

(Continued)

*Primary Examiner* — Rexford N Barnie
*Assistant Examiner* — Elim Ortiz
(74) *Attorney, Agent, or Firm* — Ladas & Parry, LLP

(57) ABSTRACT

The present invention relates to an adaptive beacon cigarette lighter plug device. The adaptive beacon cigarette lighter plug device according to the present invention, which is a cigarette lighter plug device owned by a user, includes a body insertion unit having a body structure to be inserted into a cigarette lighter receptacle of a vehicle, a power supply unit configured to receive power from the vehicle through the cigarette lighter receptacle when the body insertion unit is inserted into the cigarette lighter receptacle of the vehicle, a power conversion unit configured to convert the power received from the vehicle into at least one type of designated operating power; a universal serial bus (USB) connector unit including a USB connector configured to apply USB power converted by the power conversion unit to the outside; a power charging unit configured to charge at least power supplied through the power supply unit and/or power converted by the power conversion unit; and a beacon module configured to operate with vehicular power supplied (Continued)

from the vehicle when it is confirmed that the body insertion unit is inserted into the cigarette lighter receptacle of the vehicle and the vehicular power is being supplied from the vehicle through the power supply unit or operate with power charged in the power charging unit when it is not confirmed that the vehicular power is being supplied from the vehicle, process at least one type of bidirectional data communication including bidirectional Bluetooth data communication with a paired user terminal when a Bluetooth function of the user terminal is activated, and broadcast at least one Bluetooth-based beacon signal using the vehicular power or the charged power.

15 Claims, 16 Drawing Sheets

(56) References Cited

U.S. PATENT DOCUMENTS

| | | | |
|---|---|---|---|
| 2008/0227426 A1* | 9/2008 | Lin | H04M 1/6091 |
| | | | 455/345 |
| 2009/0251363 A1 | 10/2009 | Zohar et al. | |
| 2010/0002421 A1 | 1/2010 | Arnold, III | |
| 2013/0006469 A1* | 1/2013 | Green | B60R 21/013 |
| | | | 701/36 |
| 2013/0217333 A1 | 8/2013 | Sprigg et al. | |
| 2015/0304866 A1* | 10/2015 | Shin | H04W 24/08 |
| | | | 455/41.2 |

FOREIGN PATENT DOCUMENTS

| | | |
|---|---|---|
| JP | 3105308 U | 8/2004 |
| JP | 2008-204165 | 9/2008 |
| JP | 2009-169753 | 7/2009 |
| JP | 2014-149559 | 8/2014 |
| KR | 2002-0013957 | 2/2002 |
| KR | 20-0377087 | 3/2005 |
| KR | 10-2005-0051640 | 6/2005 |
| KR | 10-0589899 | 6/2006 |
| KR | 10-2007-0108111 | 11/2007 |
| KR | 10-2011-0107083 | 9/2011 |

OTHER PUBLICATIONS

Written Opinion of the International Searching Authority for PCT/KR2015/011946 dated Feb. 18, 2016 and its English machine translation by Google Translate.
Office Action dated Aug. 16, 2019 for Chinese Patent Application No. 201580078319.9 and its English translation provided by Applicant's foreign council.
Extended European Search Report dated Oct. 9, 2019 for European Patent Application No. 19180200.8.
Office Action dated Aug. 21, 2018 for Japanese Patent Application No. 2018-501831 and its English translation provided by Applicant's foreign council.
Partial Supplementary European Search Report dated Aug. 13, 2018 for European Patent Application No. 15887881.9.
International Preliminary Report on Patentability (Chapter I) for PCT/KR2015/011946 dated Oct. 3, 2017 and its English Translation from WIPO.
Office Action dated Dec. 3, 2018 for Chinese Patent Application No. 201580078319.9 and its English machine translation provided by Applicant's foreign council.
Extended European Search Report dated Nov. 19, 2018 for European Patent Application No. 15887881.9.
Notice of Allowance dated Jan. 15, 2019 for Japanese Patent Application No. 2018-501831 and its English machine translation by Google Translate.

* cited by examiner

ADAPTIVE TYPE BEACON CIGAR JACK DEVICE

CROSS-REFERENCE TO RELATED APPLICATIONS

This application is the U.S. National Stage of International Patent Application No. PCT/KR2015/011946 filed on Nov. 6, 2015, which claims the priority to Korean Patent Application No. 10-2015-0042971 filed on Mar. 27, 2015, the disclosures of which are hereby incorporated in their entireties by reference.

TECHNICAL FIELD

The present invention provides an adaptive beacon cigarette lighter plug device, which is inserted into a cigarette lighter receptacle, including a beacon module. The adaptive beacon cigarette lighter plug device is controlled to transmit a default beacon signal for providing a designated service in a designated space, amplify and transmit a beacon signal through vehicular power when the vehicular power is being supplied, transmit a beacon signal in a low-energy mode using charged power when the vehicular power is not being supplied, and selectively broadcast a use-specific beacon signal other than the default beacon signal through a user terminal.

BACKGROUND ART

Disclosed is a beacon service that provides an identification/authentication or membership service in a designated space (e.g., a department store, an apartment, a building, and a designated parking lot) by using a Bluetooth-based beacon module built in a cigarette lighter plug device to be inserted into a cigarette lighter receptacle of a vehicle.

Typically, a cigarette lighter plug device to be inserted into a cigarette lighter receptacle of a vehicle is used as a power supply device for various kinds of devices (e.g., a navigation device) included in the vehicle or a terminal (e.g., a user's cell phone or smart phone) (Korean Patent Publication No. 2002-0013957, published on Feb. 21, 2002). Various kinds of devices or a terminal that uses the cigarette lighter plug device as a power supply device are disposed near a windshield of the vehicle, and a terminal carried by a user transmits and receives a radio frequency signal with high power. Thus, these do not cause any problems for providing wireless communication inside the vehicle.

However, when a beacon module configured to transmit a beacon signal is included in the cigarette lighter plug device, the beacon module has difficulty in transmitting the beacon signal to the outside. A cigarette lighter receptacle of a vehicle is positioned near a gear shift between a driver seat and a passenger seat, and electromagnetic wave interference caused by various kinds of electronic devices included in the vehicle is severe at this position. In particular, because of metallic material of a vehicular frame or body, it is difficult to transmit a beacon signal to the outside of the vehicle. In addition, a Bluetooth beacon is designed to operate in a Bluetooth Low Energy (BLE) mode. In the BLE mode, it is more difficult for a beacon module built in a cigarette lighter plug device to transmit a beacon signal to the outside of the vehicle.

When a beacon module built in a cigarette lighter plug device provides a beacon service, it is possible to recognize the beacon signal through only a beacon receiver installed in a designated space and to provide a designated service, and it is difficult to provide a beacon service in a non-designated space (e.g., a space where a beacon receiver is configured to receive a default beacon signal of a beacon module). Typically, this problem may be solved by modifying or connecting a beacon receiver installed in a non-designated space to a network to remotely control the beacon receiver. In this case, there is a problem in that the infrastructure is expensive to construct or modify.

DETAILED DESCRIPTION OF THE INVENTION

Technical Problem

In order to solve the above-problems, the present invention is directed to providing an adaptive beacon cigarette lighter plug device comprising: a body insertion unit having a body structure to be inserted into a cigarette lighter receptacle of a vehicle; a power supply unit configured to receive power from the vehicle through the cigarette lighter receptacle when the body insertion unit is inserted into the cigarette lighter receptacle of the vehicle; a power conversion unit configured to convert the power received from the vehicle into at least one type of designated operating power; a universal serial bus (USB) connector unit comprising a USB connector configured to provide external USB power converted by the power conversion; a power charging unit configured to charge using at least one of power supplied through the power supply unit and power converted by the power conversion unit; and a beacon module configured to operate with vehicular power supplied from the vehicle when it is confirmed that the body insertion unit is inserted into the cigarette lighter receptacle of the vehicle and the vehicular power is being supplied from the vehicle through the power supply unit or operate with power charged in the power charging unit when it is not confirmed that the vehicular power is being supplied from the vehicle, process at least one type of bidirectional data communication including bidirectional Bluetooth data communication with a paired user terminal when a Bluetooth function of the user terminal is activated, and broadcast at least one Bluetooth-based beacon signal using the vehicular power or the charged power.

Technical Solution

The adaptive beacon cigarette lighter plug device according to the present invention, which is a cigarette lighter plug device owned by a user, includes a body insertion unit having a body structure to be inserted into a cigarette lighter receptacle of a vehicle, a power supply unit configured to receive power from the vehicle through the cigarette lighter receptacle when the body insertion unit is inserted into the cigarette lighter receptacle of the vehicle, a power conversion unit configured to convert the power received from the vehicle into at least one type of designated operating power; a universal serial bus (USB) connector unit including a USB connector configured to apply USB power converted by the power conversion unit to the outside, a power charging unit configured to charge using at least one of power supplied through the power supply unit and power converted by the power conversion unit; and a beacon module configured to operate with vehicular power supplied from the vehicle when it is confirmed that the body insertion unit is inserted into the cigarette lighter receptacle of the vehicle and the vehicular power is being supplied from the vehicle through the power supply unit or operate with power charged in the power charging unit when it is not confirmed that the vehicular power is being supplied from the vehicle, process at least one type of bidirectional data communication including bidirectional Bluetooth data communication with a paired user terminal when a Bluetooth function of the user terminal is activated, and broadcast at least one Bluetooth-based beacon signal using the vehicular power or the charged power.

According to the present invention, the beacon module may perform bidirectional USB data communication with the user terminal when the user terminal is connected to the USB connector unit.

According to the present invention, the beacon module may include a power check unit configured to check whether the vehicular power is being supplied from the vehicle; and a mode setting unit configured to set or confirm an operation mode to or as a vehicular power mode in which the beacon module operates with the vehicular power when it is confirmed that the vehicular power is being supplied and set or confirm the operation mode to or as a charged power mode in which the beacon module operates with the power charged in the power charging unit when it is not confirmed that the vehicular power is being supplied.

According to the present invention, the beacon module may include a signal control unit configured to control amplification of the beacon signal to a pre-calculated power or maximum available power and broadcast of the amplified beacon signal when the beacon module operates with the vehicular power.

According to the present invention, the beacon module may include a communication processing unit configured to receive setting information for controlling selective broadcast of a use-specific beacon signal from the user terminal through the bidirectional data communication and a transmission control unit configured to control broadcast of a use-specific beacon signal corresponding to the setting information.

According to the present invention, the transmission control unit may determine whether to broadcast the use-specific beacon signal according to a control command of the user terminal with which the bidirectional data communication is established, may determine whether to broadcast the use-specific beacon signal on the basis of whether USB connection is established or released between the USB connector unit and the user terminal while valid setting information is stored in a designated use-specific memory region, may determine whether to broadcast the use-specific beacon signal on the basis of whether the bidirectional Bluetooth data communication with the user terminal is possible or not while valid setting information is stored in a designated use-specific memory region, or may allow broadcast of a use-specific beacon signal when valid setting information is stored in a designated use-specific memory region or not allow broadcast of the use-specific beacon signal after a designated validity period passes or when a specific signal is received from the user terminal.

According to the present invention, the beacon module may further include a USB control unit configured to deactivate USB-based data communication when bidirectional Bluetooth data communication is established with the user terminal while the beacon module operates with the vehicular power supplied from the vehicle.

Advantageous Effects of the Invention

According to the present invention, it is possible to provide a beacon service such as an identification/authentication or membership service in a designated space (e.g., a department store, an apartment, a building, and a designated parking lot) by building the beacon module in the cigarette lighter plug device to be inserted into a cigarette lighter receptacle of a vehicle.

According to the present invention, it is possible to apply various beacon services in real time by controlling the beacon module by using the cigarette lighter plug device as a power supply device while the cigarette lighter plug device is inserted into a cigarette lighter receptacle of a vehicle or by using a user terminal when the cigarette lighter plug device is removed from the cigarette lighter receptacle.

According to the present invention, it is possible to provide an adaptive beacon service in real time by controlling the beacon module of the cigarette lighter plug device through a user terminal to broadcast a use-specific beacon signal other than a default beacon signal, without need for modification and without need for network connection and remote control so a beacon receiver for receiving a beacon signal of the beacon module may recognize a default beacon signal of the beacon module.

MODE OF THE INVENTION

Hereinafter, operation principles of preferred embodiments of the present invention will be described in detail with reference to the accompanying drawings. However, drawings shown below and descriptions described below are for effectively describing features of the present invention, and the present invention is not limited to the drawings and descriptions described below.

That is, embodiments described below correspond to preferable embodiments having the form of a union, and it is obvious that an embodiment in which a specific element (or step) is omitted from embodiments described below, an embodiment in which a function embodied in a specific element (or step) is divided into specific elements (or steps), an embodiment in which functions embodied in two or more elements (or steps) are integrated into one element (or step), etc. fall within the scope of the present patent although not separately mentioned in the following examples. Accordingly, it should be noted that various embodiments corresponding to subsets and complementary sets based on the following embodiments may be divisionally filed while retaining their parent's filing data.

In the following description, when a detailed description of a relevant known function or configuration is determined to unnecessarily obscure the gist of the present invention, the detailed description will be omitted. Also, terms used herein are defined in consideration of the functions of the present invention and may be changed depending on a user, the intent of an operator, or a custom. Accordingly, the terms should be defined on the basis of the following overall description of this specification.

As a result, the technical scope of the present invention is defined by the claims, and the following embodiments are intended only to explain the technical scope of the present invention to those who skilled in the art.

Figure 1:
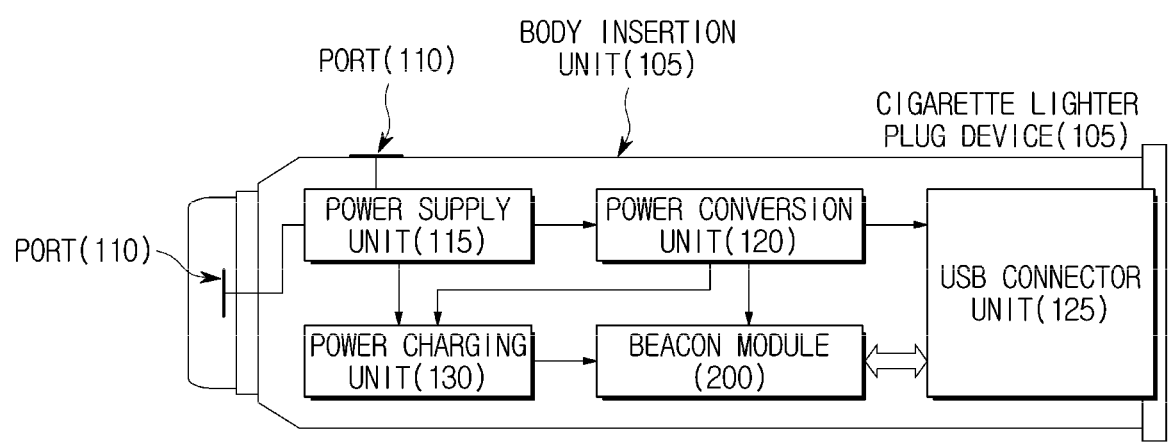
FIG. 1 is a diagram showing a configuration of an adaptive beacon cigarette lighter plug device according to an embodiment of the present invention.

FIG. 1 is a diagram showing a configuration of an adaptive beacon cigarette lighter plug device 100 according to an embodiment of the present invention.

The beacon cigarette lighter plug device 100 of the present invention includes a body insertion unit 105 having a body structure to be inserted into a cigarette lighter receptacle 375 of a vehicle, a power supply unit 115 configured to receive power from the vehicle through the cigarette lighter receptacle 375 when the body insertion unit 105 is inserted into the cigarette lighter receptacle 375 of the vehicle, a beacon module 200 installed in the body structure and configure to identify and bidirectionally communicate with a predetermined user terminal 300 or broadcast a designated beacon signal, and an adjustment unit (not shown) configured to adjust operation of the beacon module 200.

The body insertion unit 105 having the body structure to be inserted into the cigarette lighter receptacle 375 of the vehicle includes a port 110 for receiving power (e.g., 12V DC power) generated by a generator of the vehicle (or applied from a battery of the vehicle). The body structure of the cigarette lighter plug device 100 is not limited to a specific structure (or shape) and may be any structure as long as they may be inserted into the cigarette lighter receptacle 375 of the vehicle to receive the power of the vehicle through the port 110.

The power supply unit 115 collectively refers to an element that is electrically connected with the port 110 included in the body insertion unit 105 to receive the power supplied from the vehicle. When the cigarette lighter plug device 100 is inserted into the cigarette lighter receptacle 375 of the vehicle, the port 110 of the body insertion unit 105 is electrically connected with a contact point of the cigarette lighter receptacle 375.

Referring to FIG. 1, the beacon cigarette lighter plug device 100 includes a power conversion unit 120 configured to convert the power received from the vehicle into at least one type of designated operating power; a universal serial bus (USB) connector unit 125 configured to apply USB power converted by the power conversion unit 120 to the outside; a power charging unit configured to charge using at least one of power supplied through the power supply unit 115 and power converted by the power conversion unit 120; and a beacon module 200 configured to broadcast at least one Bluetooth-based beacon signal using at least one of power supplied from the vehicle and the power charged by the power charging unit 130.

The power supplied from the vehicle through the power supply unit 115 may have different electrical characteristics (e.g., voltage, electric current, etc.) from the USB power and/or the operating voltage of the beacon module 200. For example, the vehicular power may be DC 12V, and the USB power may be DC 5V. The power conversion unit 120 converts the power supplied from the vehicle through the power supply unit 115 into power having electrical characteristics consistent with the USB power and/or the operation of the beacon module 200.

The USB connector unit 125 includes a connector exposed (or capable of being exposed by opening a predetermined cover) when the body insertion unit 105 is inserted into the cigarette lighter receptacle 375 and applies, to the outside through the connector, USB power converted through the power conversion unit 120.

When the body insertion unit 105 is inserted into the cigarette lighter receptacle 375, the power charging unit 130 charges using at least one of the power supplied from the vehicle through the power supply unit 115 and the power converted through the power conversion unit 120. Preferably, the power charging unit 130 charges power needed for the beacon module 200 to operate in the low-energy mode. For example, the power charging unit 130 may include a battery or a supercapacitor.

The beacon module 200 collectively refers to a module (a set of elements) that is configured to broadcast at least one Bluetooth-based beacon signal. When the body insertion unit 105 is inserted into the cigarette lighter receptacle 375 of the vehicle, the beacon module 200 operates with vehicular power supplied from the vehicle when it is confirmed that the vehicular power is being supplied from the vehicle through the power supply unit 115 or operates with power charged in the power charging unit 130 when it is not confirmed that the vehicular power is being supplied from the vehicle. When a Bluetooth function of the user terminal 300 paired therewith is activated, the beacon module 200 performs bidirectional Bluetooth data communication with the user terminal 300. When the paired user terminal 300 is connected to the USB connector unit 125, the beacon module 200 performs bidirectional USB data communication with the user terminal and broadcasts at least one Bluetooth-based beacon signal using the vehicular power or the charged power.

When power is being supplied from the vehicle through the power supply unit 115 or when power supplied from the vehicle is converted into operating power of the beacon module 200 through the power conversion unit 120 after the body insertion unit 105 is inserted into the cigarette lighter receptacle 375 of the vehicle, the beacon module 200 may operate using vehicular power supplied from the vehicle through the power supply unit 115 or the power conversion unit 120.

When the body insertion unit 105 is removed from the cigarette lighter receptacle 375 of the vehicle or when power is not being supplied from the vehicle because the vehicle is turned off although the body insertion unit 105 is inserted into the cigarette lighter receptacle 375, the beacon module 200 operates with the power charged in the power charging unit 130. Preferably, the beacon module 200 may operate in a Bluetooth Low Energy (BLE) mode with the power charged by the power charging unit 130.

According to an embodiment of the present invention, the beacon module 200 may identify or authenticate the vehicle or a user who driving the vehicle in a designated space the vehicle is entering or may broadcast a default Bluetooth-based beacon signal in order to identify or authenticate a membership service to be provided to a user in the designated space.

When the Bluetooth function of the user terminal 300 is activated, the beacon module 200 may be paired with the user terminal 300 to perform bidirectional Bluetooth data communication with the paired user terminal 300 and may receive valid setting information for specifying the use of the Bluetooth-based beacon signal through the bidirectional Bluetooth data communication from the paired user terminal 300. When the valid setting information is received from the paired user terminal 300 through the bidirectional Bluetooth data communication, the beacon module 200 may broadcast a use-specific Bluetooth-based beacon signal that is set by the setting information, instead of the default beacon signal.

Alternatively, when the user terminal 300 is connected to the USB connector unit 125 by cable, the beacon module 200 may determine whether the terminal 300 connected to the USB connector unit 125 is a pre-registered user terminal 300 to perform bidirectional USB data communication and may receive valid setting information for specifying the use of the Bluetooth-based beacon signal from the user terminal 300 through the bidirectional USB data communication. When the valid setting information is received from the paired user terminal 300 through the bidirectional USB data communication, the beacon module 200 may broadcast a Use-specific Bluetooth-based beacon signal that is set by the setting information, instead of the default beacon signal.

When the setting information received from the user terminal 300 through at least one of the bidirectional Bluetooth data communication and the bidirectional USB data communication is not confirmed or is confirmed but not valid, the beacon module 200 may broadcast a default Bluetooth-based beacon signal.

Figure 2:
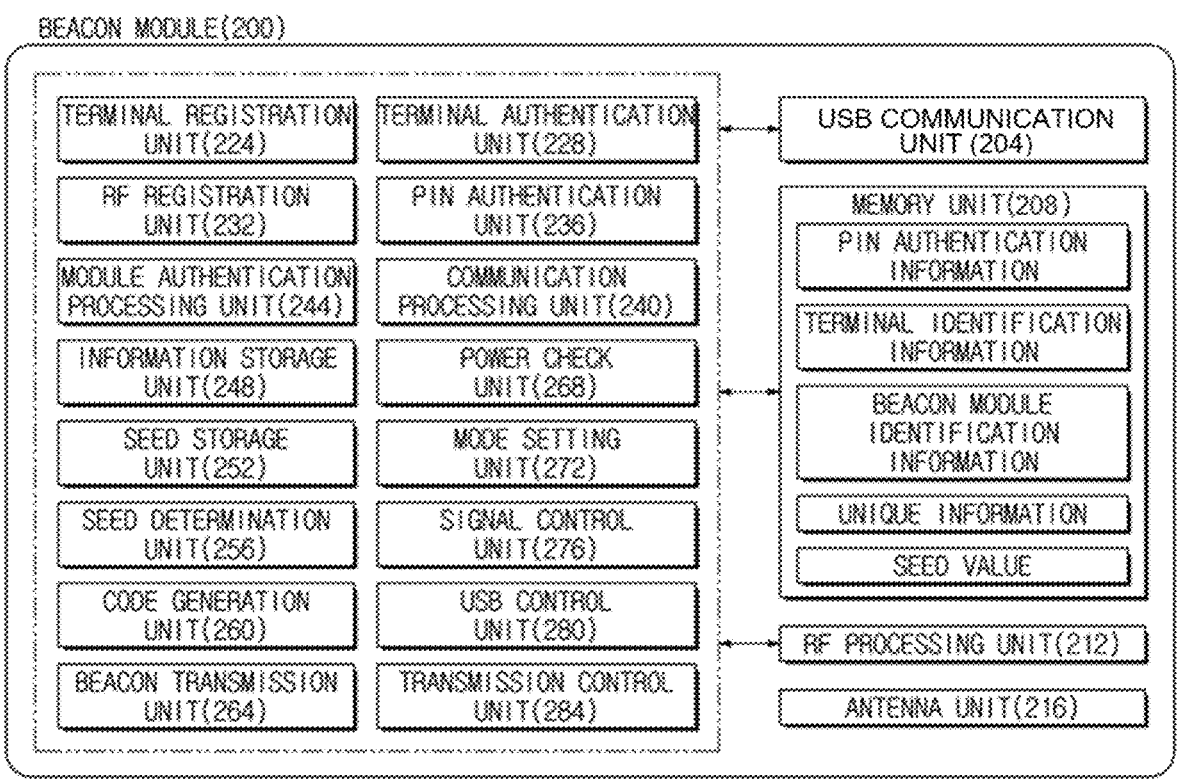
FIG. 2 is a diagram showing a configuration of a beacon module built in a cigarette lighter plug device according to an embodiment of the present invention.

FIG. 2 is a diagram showing a configuration of the beacon module 200 built in the cigarette lighter plug device 100 according to an embodiment of the present invention.

Referring to FIG. 2, the beacon module 200 includes a control unit 220 configured to control operation of the beacon module 200, a memory unit 208 configured to store a set of data (or program code) needed to operate the beacon module 200, an RF processing unit 212 configured to perform RF processing to perform bidirectional Bluetooth data communication or broadcast a beacon signal, and an antenna unit 216 configured to transmit or receive a radio frequency signal for performing the bidirectional Bluetooth data communication or transmit a radio frequency signal for broadcasting the beacon signal, and further includes a USB communication unit 204 electrically connected with the USB connector unit 125 and configured to process the bidirectional USB data communication.

The beacon module 200 is produced to include one or more surface mount devices (SMDs) for beacon operation in a printed circuit board (PCB). The control unit 220, the memory unit 208, the RF processing unit 212, and the like may be implemented in the form of an integrated chip having a beacon function or may be implemented in the form of individual devices mounted on the PCB or in the form of a combination of an integrated chip and each of the individual devices.

The control unit 220 collectively refers to an element that is configured to control operation of the beacon module 200. The control unit 220 includes at least one processor and at least one execution memory and is connected with the elements included in the beacon module 200 via a bus. According to the present invention, the control unit 220 loads at least one piece of program code included in the beacon module 200 and calculates the loaded program code through the processor, and the control unit 220 delivers a result of the calculation to at least one of the elements via the bus and controls operation of the beacon module 200. For convenience, the configuration of the program implemented as program code in the beacon module 200 will be shown in the control unit 220 and described below.

The memory unit 208 collectively refers to a non-volatile memory included in the beacon module 200. The memory unit 208 stores and maintains at least one piece of program code executed through the control unit 220 and at least one set of data used by the program code. By default, the memory unit 208 stores system program code and a set of system data corresponding to an operating system of the beacon module 200 and at least one piece of application program code and at least one set of application data. In addition, the memory unit 208 may store program code and a set of data corresponding to the program of the present invention.

According to an embodiment of the present invention, the memory unit 208 may include a default memory region that stores a set of data for broadcasting a default Bluetooth-based beacon signal.

According to an embodiment of the present invention, the memory unit 208 may include a use-specific memory region that stores a set of data for broadcasting a use-specific Bluetooth-based beacon signal that is set by the setting information received from the user terminal 300 through at least bidirectional data communication.

According to an embodiment of the present invention, the memory unit 208 may include a PIN storage region that stores personal identification number (PIN) authentication information for performing a PIN authentication procedure.

According to an embodiment of the present invention, the memory unit 208 may include an identification information storage region that stores terminal identification information for uniquely identifying the paired user terminal 300 to perform bidirectional Bluetooth data communication and/or that stores registered terminal identification information to perform bidirectional USB data communication.

According to an embodiment of the present invention, the memory unit 208 may store beacon module identification information that allows the user terminal 300 to uniquely identify and authenticate the beacon module 200.

The RF processing unit 212 collectively refers to an element that performs RF processing (e.g., modulation of radio frequency signals, etc.) to transmit or receive a radio frequency signal through the antenna unit 216. The RF processing unit 212 performs RF processing to broadcast a beacon signal according to a Bluetooth standard capable of broadcasting a beacon signal, which follows Bluetooth Smart, or performs RF processing to perform bidirectional Bluetooth data communication with the paired user terminal 300.

The USB communication unit 204 may be electrically connected with a connector (e.g., D+ and/or D−) included in the USB connector unit 125 of the cigarette lighter plug device 100 and configured to process bidirectional USB data communication with a pre-registered user terminal 300 (e.g., a user's wireless terminal such as a cellular phone, a smartphone, and a tablet PC) among terminals connected to the USB connector unit 125. The bidirectional USB data communication may include a USB communication function for transmitting and receiving USB packets and may also include a USB protocol function for allowing an external terminal connected to the USB connector unit 125 to detect the beacon module 200 and prepare for USB communication.

According to an embodiment of the present invention, the USB communication unit 204 maintains electrical connection with the connector of the USB connector unit 125. However, a bidirectional USB data communication function of the USB communication unit 204 is selectively activated or deactivated depending on a designated condition. When the bidirectional USB data communication function of the USB communication unit 204 is activated, it is preferable that the USB communication unit 204 process bidirectional USB data communication with the terminal 300 connected to the USB connector unit 125. On the other hand, when the bidirectional USB data communication function of the USB communication unit 204 is deactivated, the USB communication unit 204 may not process the bidirectional USB data communication although the user terminal 300 is connected to the USB connector unit 125.

Referring to FIG. 2, the beacon module 200 includes a terminal registration unit 224 configured to perform a Bluetooth pairing procedure and/or a terminal registration procedure to register valid terminal identification information of the user terminal 300 in the identification information storage region, a terminal authentication unit 228 configured to identify and authenticate the user terminal 300, which performs at least one of bidirectional Bluetooth data communication and bidirectional USB data communication by using the valid terminal identification information registered in the identification information storage region, and a communication processing unit 240 configured to process the bidirectional Bluetooth data communication or the bidirectional USB data communication with the user terminal 300 identified and authenticated through the user identification information. According to an embodiment, the beacon module 200 may further include a PIN registration unit 232 configured to receive PIN authentication information for PIN authentication from the user terminal 300 through at least one of the bidirectional Bluetooth data communication and the bidirectional USB data communication and store the PIN authentication information in the PIN storage region, and a PIN authentication unit 236 configured to perform a PIN authentication procedure using the PIN authentication information registered in the PIN storage region if necessary when at least one of the bidirectional Bluetooth data communication and the bidirectional USB data communication is established with a user terminal 300 corresponding to the terminal identification information registered in the identification information storage region.

When a user purchases the cigarette lighter plug device 100 and tries Bluetooth pairing between a user terminal 300 of the user and the beacon module 200, the terminal registration unit 224 checks whether valid terminal identification information is registered in the identification information storage region. The beacon module 200 of the cigarette lighter plug device 100 is produced to store a NULL value or temporary information. When the user purchases the cigarette lighter plug device 100 and then tries first pairing, the valid terminal identification information is not registered in the identification information storage region. In this case, the terminal registration unit 224 performs a pairing procedure with the user terminal 300 according to the Bluetooth pairing procedure.

When the user installs a specific program 325 on the user terminal 300 to communicate with the beacon module 200 of the cigarette lighter plug device 100, the terminal registration unit 224 communicates with the program 325 of the paired user terminal 300 to check terminal identification information capable of uniquely identifying and authenticating the user terminal 300 and stores the checked terminal identification information in the identification information storage region. In this case, the terminal identification information may include information for uniquely identifying the user terminal 300 and information for uniquely identifying and authenticating even the program 325 installed on the user terminal 300. For example, the terminal identification information may include at least one or a combination of a terminal identification value for uniquely identifying the user terminal 300, an app identification value for uniquely identifying the program 325 mounted on the user terminal 300 to communicate with the beacon module 200, a key value exchanged between the program 325 of the user terminal 300 and the beacon module 200, and a authentication value generated using one or more of the values.

When a user purchases the cigarette lighter plug device 100 and connects the USB connector of the cigarette lighter plug device 100 with the user terminal 300 of the user by cable, the terminal registration unit 224 checks whether valid terminal identification information is registered in the identification information storage region. When the valid terminal identification information is not registered in the identification information storage region, the terminal registration unit 224 tries to communicate with the specific program 325 installed on the user terminal 300 connected by cable. When a specific program for communicating with the beacon module 200 is installed on the user terminal 300, the terminal registration unit 224 communicates with the program 325 of the user terminal 300 to check the terminal identification information capable of uniquely identifying and authenticating the user terminal 300 and stores the checked terminal identification information in the identification information storage region.

When valid terminal identification information of the user terminal 300 is registered in the identification information storage region through the terminal registration unit 224, the terminal authentication unit 228 may identify and authenticate the user terminal 300 that establishes at least one of bidirectional Bluetooth data communication and bidirectional USB data communication by using the terminal identification information registered in the identification information storage region. In this case, the communication processing unit 240 may process the bidirectional Bluetooth data communication or bidirectional USB data communication with the authenticated user terminal 300.

When at least one of the bidirectional Bluetooth data communication and the bidirectional USB data communication is established with the user terminal 300, the PIN registration unit 232 checks whether valid PIN authentication information is registered in the PIN storage region. When valid PIN authentication information is not registered in the PIN storage region, the PIN registration unit 232 may receive PIN authentication information through a program 325 of a user terminal 300, with which at least one of the bidirectional Bluetooth data communication and the bidirectional USB data communication is established, and store the received PIN authentication information in the PIN storage region.

When valid PIN authentication information is registered in the PIN storage region, the PIN authentication unit 236 may receive PIN information from the program 325 of the user terminal 300, with which at least one of the bidirectional Bluetooth data communication and the bidirectional USB data communication is established, and may perform a PIN authentication procedure for performing authentication by using the PIN authentication information. Preferably, the PIN authentication unit 236 may perform the PIN authentication procedure in adding/renewing a user terminal 300, changing important settings of the beacon module 200, or initializing settings of the beacon module 200.

Referring to FIG. 2, the beacon module 200 may include a module authentication processing unit 244 configured to provide beacon module identification information for uniquely identifying and authenticating the beacon module 200 to the user terminal 300 when at least bidirectional data communication is established with the user terminal 300.

The module authentication processing unit 244 stores the beacon module identification information for uniquely identifying and authenticating the beacon module 200 in a designated storage region of the memory unit 208. The beacon module identification information may include a unique module ID that is assigned when the beacon module 200 is produced. According to an embodiment, the module authentication processing unit 244 may receive beacon module identification information for uniquely identifying and authenticating the beacon module 200 from the user terminal 300 authenticated through the PIN authentication unit 236 and store the beacon module identification information in the designated storage region of the memory unit 208 and/or may store beacon module identification information including a key value obtained by performing a designated key exchange procedure with the program 325 of the user terminal 300 in the designated storage region of the memory unit 208. For example, the beacon module identification information may include a module ID assigned to the beacon module 200, a key value exchanged with the terminal, and an authentication value generated by using one or both of the module ID and the key value.

When at least one of the bidirectional Bluetooth data communication and the bidirectional USB data communication is established with the user terminal 300, the module authentication processing unit 244 may enable the program 325 of the user terminal 300 to uniquely identify and authenticate the beacon module 200 by checking the beacon module identification information and providing the beacon module identification information to the user terminal 300.

When the module authentication processing unit 244 is included in the beacon module 200, the beacon module 200 may authenticate the user terminal 300 (or the program 325 of the user terminal 300) with which the bidirectional data communication is established through the terminal authentication unit 228, and the program 325 of the user terminal 300 may perform bidirectional mutual authentication for uniquely identifying and authenticating the beacon module 200 built in the cigarette lighter plug device 100 through the beacon module identification information. In this case, the communication processing unit 240 may transmit or receive various kinds of information or data to or from the program 325 of the user terminal 300 that is mutually authenticated.

Referring to FIG. 2 according to the first embodiment of the present invention, the beacon module 200 includes an information storage unit 248 configured to store unique information to be broadcast through a beacon signal and a beacon transmission unit 264 configured to control broadcast of the beacon signal including unique information.

The information storage unit 248 may store the unique information to be broadcast through the beacon signal in the default memory region when the beacon module 200 is produced. Alternatively, the information storage unit 248 may receive unique information through at least one of the bidirectional Bluetooth data communication and the bidirectional USB data communication and store the received unique information in the default memory region.

The beacon transmission unit 264 checks the unique information stored in the default memory region of the memory unit 208 and allows a default beacon signal including the unique information of the default memory region to be broadcast through the RF processing unit 212. Preferably, the beacon transmission unit 264 may allow the beacon signal to be broadcast at least a certain number of times (or periodically).

Referring to FIG. 2 according to the second embodiment of the present invention, the beacon module 200 includes a code generation unit 260 configured to dynamically generate disposable code to be broadcast through a beacon signal and a beacon transmission unit 264 configured to control broadcast of the beacon signal including the generated disposable code. The beacon module 200 further includes a seed storage unit 252 configured to store one or more static seed values for generating the disposable code and a seed determination unit 256 configured to determine at least one dynamic seed value for generating the disposable code.

The seed storage unit 252 may store one or more static seed values for generating disposable code in the default memory region when the beacon module 200 is produced. Alternatively, the seed storage unit 252 may receive one or more static seed values through at least one of the bidirectional Bluetooth data communication and the bidirectional USB data communication and store the static seed values in the default memory region.

The seed determination unit 256 checks at least one dynamic see value (e.g., a time value, a random value, or the like) when the disposable code is generated. Depending on the embodiment, the seed determination unit 256 may receive a dynamic seed value through at least one of the bidirectional Bluetooth data communication and the bidirectional USB data communication.

The code generation unit 260 uses a designated code generation algorithm to dynamically generate the disposable code to be broadcast through the beacon signal. According to an embodiment of the present invention, the code generation unit 260 may apply the one or more static seed values stored in the default memory region of the memory unit 208 and the at least one dynamic seed value determined through the seed determination unit 256 to the designated code generation algorithm in order to dynamically generate the disposable code to be broadcast through the beacon signal.

The beacon transmission unit 264 checks the disposable code that is dynamically generated by the code generation unit 260 and allows a default beacon signal including the disposable code to be broadcast through the RF processing unit 212. Preferably, the beacon transmission unit 264 may allow the beacon signal to be broadcast at least a certain number of times (or periodically).

Referring to FIG. 2 according to the third embodiment of the present invention, the beacon module 200 includes an information storage unit 248 configured to store unique information to be broadcast through a beacon signal, a code generation unit 260 configured to dynamically generate disposable code to be broadcast through the beacon signal, and a beacon transmission unit 264 configured to control broadcast of the beacon signal including the unique information and the disposable code. The beacon module 200 further includes a seed storage unit 252 configured to store one or more static seed values for generating the disposable code and a seed determination unit 256 configured to determine at least one dynamic seed value for generating the disposable code.

The code generation unit 260 uses a designated code generation algorithm to dynamically generate disposable code to be broadcast through the beacon signal. Preferably, the code generation unit 260 may apply the one or more static seed values stored in the default memory region of the memory unit 208 and the at least one dynamic seed value determined through the seed determination unit 256 to the designated code generation algorithm in order to dynamically generate the disposable code to be broadcast through the beacon signal.

The beacon transmission unit 264 allows a default beacon signal including the unique information and the disposable code to be broadcast through the RF processing unit 212 after checking the unique information that is stored in the default memory region of the memory unit 208 and checking the disposable code that is dynamically generated by the code generation unit 260. Preferably, the beacon transmission unit 264 may allow the beacon signal to be broadcast at least a certain number of times (or periodically).

Referring to FIG. 2, the beacon module 200 includes a power check unit 268 configured to check whether vehicular power is being supplied from a vehicle, a mode setting unit 272 configured to set or confirm the operation mode to or as a vehicular power mode in which the beacon module 200 operates with the vehicular power when it is confirmed that the vehicular power is being supplied and configured to set or confirm the operation mode to or as a charged power mode in which the beacon module 200 operates with power charged in the power charging unit 130 when it is not confirmed that the vehicular power is being supplied, and a signal control unit 276 configured to amplify a beacon signal to be broadcast through the RF processing unit 212 and control signal power of the beacon signal so that the beacon signal reaches up to a designated range outside the vehicle when it is confirmed that the vehicular power is being supplied.

The power check unit 268 may check whether the vehicular power is being supplied from the vehicle to the power supply unit 115 by means of a predetermined sensor (e.g., a current sensor, a voltage sensor, etc.; not shown). Alternatively, the power check unit 268 may check whether the vehicular power is being converted by the power conversion unit 120 by means of a predetermined sensor (not shown). Alternatively, the power check unit 268 may determine whether the cigarette lighter plug device 100 is grounded to check whether the vehicular power is being supplied (e.g., when the vehicular power is being supplied, the power is grounded on a vehicular body (or the ground)). Alternatively, the power check unit 268 may determine whether the body insertion unit 105 is inserted into the cigarette lighter receptacle 375 of the vehicle by means of a predetermined sensor (e.g., a pressure sensor; not shown) and may check whether the vehicular power is being supplied (e.g., when the body insertion unit 105 is inserted into the cigarette lighter receptacle 375 of the vehicle, the vehicular power is supplied unless the vehicle is turned off). Preferably, the power check unit 268 may check whether the vehicular power is being supplied by using at least one or a combination of the embodiments.

When it is confirmed by the power check unit 268 that the vehicular power is being supplied, the mode setting unit 272 may set or confirm the operation mode of the beacon module 200 to or as the vehicular power mode, in which the beacon module 200 operates with the vehicular power supplied from the vehicle.

When it is not confirmed by the power check unit 268 that the vehicular power is being supplied, the mode setting unit 272 may set or confirm the operation mode of the beacon module 200 to or as the charged power mode, in which the beacon module 200 operates with the power charged in the power charging unit 130.

According to an embodiment of the present invention, the mode setting unit 272 may set or confirm the operation mode of the beacon module 200 built in the cigarette lighter plug device 100 depending on whether the vehicular power is being supplied even when the operation mode of the beacon module 200 is not set through a separate adjustment unit included in the cigarette lighter plug device 100.

When the operation mode of the beacon module 200 is set to or confirmed as the vehicular power mode, the signal control unit 276 may amplify a beacon signal to be broadcast through the RF processing unit 212 (e.g., to a pre-calculated power or the maximum power) and may control signal power of the beacon signal so that the beacon signal reaches up to a designated range outside the vehicle (e.g., within 30 m from the vehicle). Typically, the cigarette lighter receptacle 375 of the vehicle is positioned near a gear shift between a driver seat and a passenger seat. At this position, electromagnetic wave interference caused by various kinds of electronic devices included in the vehicle is severe, and also it is difficult for a radio frequency signal transmitted through the antenna unit 216 of the beacon module 200 to omni-directionally reach up to a designated range outside the vehicle because of metallic material of a vehicular frame or body or various kinds of blocking films attached to vehicular windows. When the beacon module 200 of the cigarette lighter plug device 100 is positioned near a windshield of the vehicle, to which a separate blocking film is not attached, it is possible for a radio frequency signal to relatively easily transmit through the glass and reach up to the designated region outside the vehicle. However, at the position of the cigarette lighter receptacle 375 included in the vehicle, it is difficult for a radio frequency signal of the beacon module 200 built in the cigarette lighter plug device 100 to omni-directionally reach up to the designated range outside the vehicle because of the electromagnetic wave interference caused by various kinds of electronic devices included in the vehicle and the metallic material of the vehicular frame or body or the blocking film attached to the vehicular glass. Accordingly, when the cigarette lighter plug device 100 is inserted into the cigarette lighter receptacle 375 of the vehicle to receive power from the vehicle, the signal control unit 276 may allow the beach signal broadcast through the RF processing unit 212 to be amplified to a pre-calculated power (or power greater than or equal to the low-energy mode) or the maximum power within an available range and transmitted. Thus, it is possible to allow the beacon signal broadcast by the beacon module 200 to reach up to the designated range outside the vehicle while overcoming electromagnetic wave interference caused by various kinds of electronic devices included in the vehicle or interference caused by the metallic material or the blocking film.

When the operation mode of the beacon module 200 is set to or confirmed as the charged power mode, the signal control unit 276 may allow the beacon signal broadcast by the RF processing unit 212 to be broadcast in the low-energy mode. Preferably, the signal control unit 276 may allow a beacon signal broadcast the RF processing unit 212 to be broadcast in the BLE mode.

Referring to FIG. 2, the beacon module 200 includes a communication processing unit 240 configured to receive setting information for controlling the beacon module 200 to selectively broadcast a use-specific beacon signal from the user terminal 300, with which at least one of bidirectional Bluetooth data communication and bidirectional USB data communication is established, and a transmission control unit 284 configured to control broadcast of a use-specific beacon signal corresponding to the setting information.

When the beacon module 200 uniquely identifies and authenticates the user terminal 300 through at least one of bidirectional Bluetooth data communication and bidirectional USB data communication and establishes communication with the user terminal 300, the communication processing unit 240 receives setting information for controlling the beacon module 200 to selectively broadcast a use-specific beacon signal from the user terminal 300, with which the bidirectional data communication is established. Preferably, the setting information may include at least one or a combination of unique information to be included in the use-specific beacon signal, a seed value for generating disposable code to be included in the use-specific beacon signal (e.g., one or more static seed values and/or at least one dynamic seed value), disposable code generated to be included in the use-specific beacon signal, and a protocol structure of the use-specific beacon signal for broadcasting a beacon signal appropriate for a designated use.

Referring to FIG. 2 according to the first embodiment of the present invention, the beacon module 200 includes a communication processing unit 240 configured to receive setting information to be broadcast through the use-specific beacon signal from the user terminal 300 through at least one of bidirectional Bluetooth data communication and bidirectional USB data communication, an information storage unit 248 configured to store unique information received for the use-specific beacon signal, and a beacon transmission unit 264 configured to control broadcast of the use-specific beacon signal including the unique information.

The communication processing unit 240 communicates with the user terminal 300 through at least one of bidirectional Bluetooth data communication and bidirectional USB data communication to receive the setting information including the unique information to be broadcast through the use-specific beacon signal from the user terminal 300. According to an embodiment of the present invention, the unique information received through the communication processing unit 240 may be a static value for a specific use or may include disposable code generated for a specific use by the user terminal (or a designated server 370).

The information storage unit 248 may store the unique information included in the setting information received from the user terminal 300 through the communication processing unit 240 in the use-specific memory region of the memory unit 208.

The transmission control unit 284 may determine whether to broadcast a default beacon signal based on the information stored in the default memory region or a use-specific beacon signal including the unique information stored in the use-specific memory region. When it is determined to broadcast the use-specific beacon signal, the transmission control unit 284 allows the use-specific beacon signal to be broadcast through the beacon transmission unit 264.

When the transmission control unit 284 determines to broadcast the use-specific beacon signal, the beacon transmission unit 264 checks the unique information stored in the use-specific memory region of the memory unit 208 and allows the use-specific beacon signal including the unique information to be broadcast through the RF processing unit 212. Preferably, the beacon transmission unit 264 may allow the beacon signal to be broadcast at least a certain number of times (or periodically).

Referring to FIG. 2 according to the second embodiment of the present invention, the beacon module 200 includes a communication processing unit 240 configured to receive setting information including one or more seed values for dynamically generating disposable code to be broadcast through the use-specific beacon signal from the user terminal 300 through at least one of bidirectional Bluetooth data communication and bidirectional USB data communication, a code generation unit 260 configured to dynamically generate the disposable code to be broadcast through the use-specific beacon signal, and a beacon transmission unit 264 configured to control broadcast of the use-specific beacon signal including the generated disposable code. Also, the beacon module 200 further includes one or both of a seed storage unit 252 configured to store seed values received for the use-specific beacon signal and a seed determination unit 256 configured to determine a seed value for generating the disposable code.

The communication processing unit 240 communicates with the user terminal 300 through at least one of bidirectional Bluetooth data communication and bidirectional USB data communication to receive the setting information including the seed values to be broadcast through the use-specific beacon signal from the user terminal 300. For example, the communication processing unit 240 may receive a static seed value for generating the disposable code and/or a dynamic seed value for generating the disposable code.

The seed storage unit 252 may store the one or more seed values included in the setting information received from the user terminal 300 through the communication processing unit 240 in the use-specific memory region of the memory unit 208. The seed values included in the setting information may include a static seed value for dynamically generating the disposable code and/or a dynamic seed value determined by the user terminal 300 to generate the disposable code according to an embodiment.

The transmission control unit 284 may determine whether to broadcast a default beacon signal based on the information stored in the default memory region or a use-specific beacon signal including the disposable code generated using the seed value stored in the use-specific memory region. When it is determined to broadcast the use-specific beacon signal, the transmission control unit 284 allows the use-specific beacon signal to be broadcast through the beacon transmission unit 264.

When the transmission control unit 284 determines to broadcast the use-specific beacon signal, the seed determination unit 256 checks the seed value stored in the use-specific memory region (e.g., a static seed value and/or a dynamic seed value) and/or determines a separate dynamic seed value for generating the disposable code. The code generation unit 260 uses a designated code generation algorithm to dynamically generate the disposable code to be broadcast through the use-specific beacon signal. According to an embodiment of the present invention, the code generation unit 260 may apply one or more seed values confirmed from the use-specific memory region of the memory unit 208 and/or the separate dynamic seed value to the code generation algorithm to dynamically generate the disposable code to be broadcast through the use-specific beacon signal.

The beacon transmission unit 264 checks the disposable code that is dynamically generated by the code generation unit 260 and allows the use-specific beacon signal including the disposable code to be broadcast through the RF processing unit 212. Preferably, the beacon transmission unit 264 may allow the beacon signal to be broadcast at least a certain number of times (or periodically).

Referring to FIG. 2 according to the third embodiment of the present invention, the beacon module 200 includes a communication processing unit 240 configured to receive setting information including unique information to be broadcast through a use-specific beacon signal and including one or more seed values for dynamically generating disposable code to be broadcast through the use-specific beacon signal from the user terminal 300 through at least one of bidirectional Bluetooth data communication and bidirectional USB data communication, an information storage unit 248 configured to store the unique information to be broadcast through the use-specific beacon signal, a code generation unit 260 configured to dynamically generate the disposable code to be broadcast through the use-specific beacon signal, and a beacon transmission unit 264 configured to control broadcast of the use-specific beacon signal including the unique information and the disposable code. Also, the beacon module 200 further includes one or both of a seed storage unit 252 configured to store seed values received for the use-specific beacon signal and a seed determination unit 256 configured to determine a seed value for generating the disposable code.

The communication processing unit 240 communicates with the user terminal 300 through at least one of bidirectional Bluetooth data communication and bidirectional USB data communication to receive the setting information including the unique information to be broadcast through the use-specific beacon signal and the one or more seed values for dynamically generating the disposable code to be broadcast through the use-specific beacon signal from the user terminal 300.

The information storage unit 248 may store the unique information included in the setting information received from the user terminal 300 through the communication processing unit 240 in the use-specific memory region of the memory unit 208.

The seed storage unit 252 may store the one or more seed values included in the setting information received from the user terminal 300 through the communication processing unit 240 in the use-specific memory region of the memory unit 208. The seed values included in the setting information may include a static seed value for dynamically generating the disposable code and may include a dynamic seed value determined by the user terminal 300 to generate the disposable code according to an embodiment.

The transmission control unit 284 may determine whether to broadcast a default beacon signal based on the information stored in the default memory region or a use-specific beacon signal including the disposable code generated using the seed value stored in the use-specific memory region as well as the unique information stored in the use-specific memory region. When it is determined to broadcast the use-specific beacon signal, the transmission control unit 284 allows the use-specific beacon signal to be broadcast through the beacon transmission unit 264.

When the transmission control unit 284 determines to broadcast the use-specific beacon signal, the seed determination unit 256 checks the seed value stored in the use-specific memory region (e.g., a static seed value and/or a dynamic seed value) and/or determines a separate dynamic seed value for generating the disposable code. The code generation unit 260 uses a designated code generation algorithm to dynamically generate the disposable code to be broadcast through the use-specific beacon signal. According to an embodiment of the present invention, the code generation unit 260 may apply one or more seed values confirmed from the use-specific memory region of the memory unit 208 and/or the separate dynamic seed value to the code generation algorithm to dynamically generate the disposable code to be broadcast through the use-specific beacon signal.

The beacon transmission unit 264 allows the use-specific beacon signal including the unique information and the disposable code to be broadcast through the RF processing unit 212 after checking the unique information that is stored in the use-specific memory region of the memory unit 208 and checking the disposable code that is dynamically generated through the code generation unit 260. Preferably, the beacon transmission unit 264 may allow the beacon signal to be broadcast at least a certain number of times (or periodically).

According to a first use-specific beacon embodiment of the present invention, the transmission control unit 284 may determine whether to broadcast a use-specific beacon signal or a default beacon signal depending on a control command of the user terminal 300, with which at least one of bidirectional Bluetooth data communication and bidirectional USB data communication is established.

According to a second use-specific beacon embodiment of the present invention, the transmission control unit 284 may determine whether to broadcast a use-specific beacon signal or a default beacon signal depending on whether a USB connection is established or released between the USB connector unit 125 and the user terminal 300 while valid setting information is stored in the use-specific memory region according to a designated scenario. For example, assume that the beacon signal broadcast through the setting information stored in the use-specific memory region is a beacon signal specific to a parking location service of a designated parking lot. Under this assumption, when a USB connection is established between the USB connector unit 125 and the user terminal 300, the transmission control unit 284 may determine that a user is driving a vehicle and then may allow a use-specific beacon signal for the parking location to be broadcast. On the other hand, when the USB connection is released between the USB connector unit 125 and the user terminal 300 while the use-specific beacon signal is broadcast, the transmission control unit 284 may determine that the user has parked and exited the vehicle and then may disallow broadcast of or deactivate the use-specific beacon signal for parking location.

According to a third use-specific beacon embodiment of the present invention, the transmission control unit 284 may determine whether to broadcast a use-specific beacon signal or a default beacon signal depending on whether bidirectional Bluetooth data communication with the user terminal 300 is possible while valid setting information is stored in the use-specific memory region according to a designated scenario. For example, assume that the beacon signal broadcast through the setting information stored in the use-specific memory region is a beacon signal specific to a parking fee payment service of a designated parking lot. Under this assumption, when bidirectional Bluetooth data communication with the user terminal 300 is possible, the transmission control unit 284 may determine that the user is driving the vehicle and allow a use-specific beacon signal for parking fee payment to be broadcast.

According to a fourth use-specific beacon embodiment of the present invention, the transmission control unit 284 may allow transmission of the use-specific beacon signal while valid setting information is stored in the use-specific memory region according to a designated scenario. When a designated validity period passes or when a specific signal is received from the user terminal 300 through at least one of bidirectional Bluetooth data communication and bidirectional USB data communication, the transmission control unit 284 may disallow broadcast of or deactivate the use-specific beacon signal. For example, assume that the beacon signal broadcast through the setting information stored in the use-specific memory region is a beacon signal specific to a parking fee payment service of a designated parking lot. Under this assumption, the transmission control unit 284 allows a use-specific beacon signal for paying a parking fee to be broadcast while the setting information is stored in the use-specific memory region. However, when a payment completion signal for the parking fee is received from the user terminal 300 through the bidirectional Bluetooth data communication, the transmission control unit 284 may disallow broadcast of or deactivate the use-specific beacon signal for paying the parking fee.

According to a fifth use-specific beacon embodiment of the present invention, the transmission control unit 284 may determine whether to broadcast a use-specific beacon signal or a default beacon signal by partially combining at least two or more of the first to fourth use-specific beacon embodiments.

According to an embodiment of the present invention, the communication processing unit 240 may determine whether a default beacon signal is being broadcast through the beacon transmission unit 264 or whether a use-specific beacon signal is being broadcast under the control of the transmission control unit 284, configure beacon transmission information for identifying which of the default beacon signal and the use-specific beacon signal is being broadcast, and provide the beacon transmission information to the user terminal 300 through at least one of bidirectional Bluetooth data communication and bidirectional USB data communication. Thus, the user terminal 300 may distinguish a beacon signal being transmitted through the beacon module 200.

Referring to FIG. 2, the beacon module 200 includes a USB control unit 280 configured to deactivate bidirectional USB data communication of the USB communication unit 204 when the beacon module 200 operates with vehicular power and has bidirectional Bluetooth data communication established with the user terminal 300 and activate the bidirectional USB data communication of the USB communication unit 204 in other cases. When the bidirectional USB data communication of the USB communication unit 204 is activated, the communication processing unit 240 may process the bidirectional USB data communication with the user terminal 300, which is connected to the USB connector unit 125 through the USB communication unit 204.

When bidirectional Bluetooth communication between the beacon module 200 and the user terminal 300 is possible because a Bluetooth function of the user terminal 300 is activated while the operation mode of the beacon module 200 is set to or confirmed as the vehicular power mode by the beacon module 200 operating with the vehicular power, the USB control unit 280 may control the USB communication unit 204 to deactivate a bidirectional USB data communication function. That is, when a user inserts the cigarette lighter plug device 100 into the cigarette lighter receptacle 375 of the vehicle and then connects any external device (e.g., a navigation device or the user terminal 300)) to the USB connector unit 125 of the cigarette lighter plug device 100 by cable, the user is likely to intend to supply power to the external device connected by cable by using the cigarette lighter plug device 100 as a power supply device. In this case, when bidirectional USB data communication is activated between the external device and the beacon module 200 whenever the external device is connected to the USB connector unit 125, there is an inconvenience in that bidirectional USB data communication is unintentionally activated and now needs to be released. Thus, when there is no need for separate data communication because bidirectional Bluetooth data communication is established between the beacon module 200 and the user terminal 300 while the beacon module 200 operates with the vehicular power, the USB control unit 280 may ensure that the cigarette lighter plug device 100 operates as a power supply device included in the USB connector unit 125 by deactivating the bidirectional USB data communication of the USB communication unit 204.

On the other hand, when it is not confirmed that the vehicular power is being supplied, when the beacon module 200 operates with the charged power, or when it is not confirmed that bidirectional Bluetooth data communication is established with the user terminal 300, the USB control unit 280 may control activation of the bidirectional USB data communication function of the USB communication unit 204. That is, when a user connects the user terminal 300 to the USB connector unit 125 of the cigarette lighter plug device 100 by cable while it is not confirmed that the vehicular power is being supplied, while the beacon module 200 operates with the charged power, or while it is not confirmed that bidirectional Bluetooth data communication is established with the user terminal 300, the USB control unit 280 may register that the user intends to perform bidirectional USB data communication with the beacon module 200 of the cigarette lighter plug device 100 and may control the USB communication unit 204 to activate the bidirectional USB data communication function.

Figure 3:
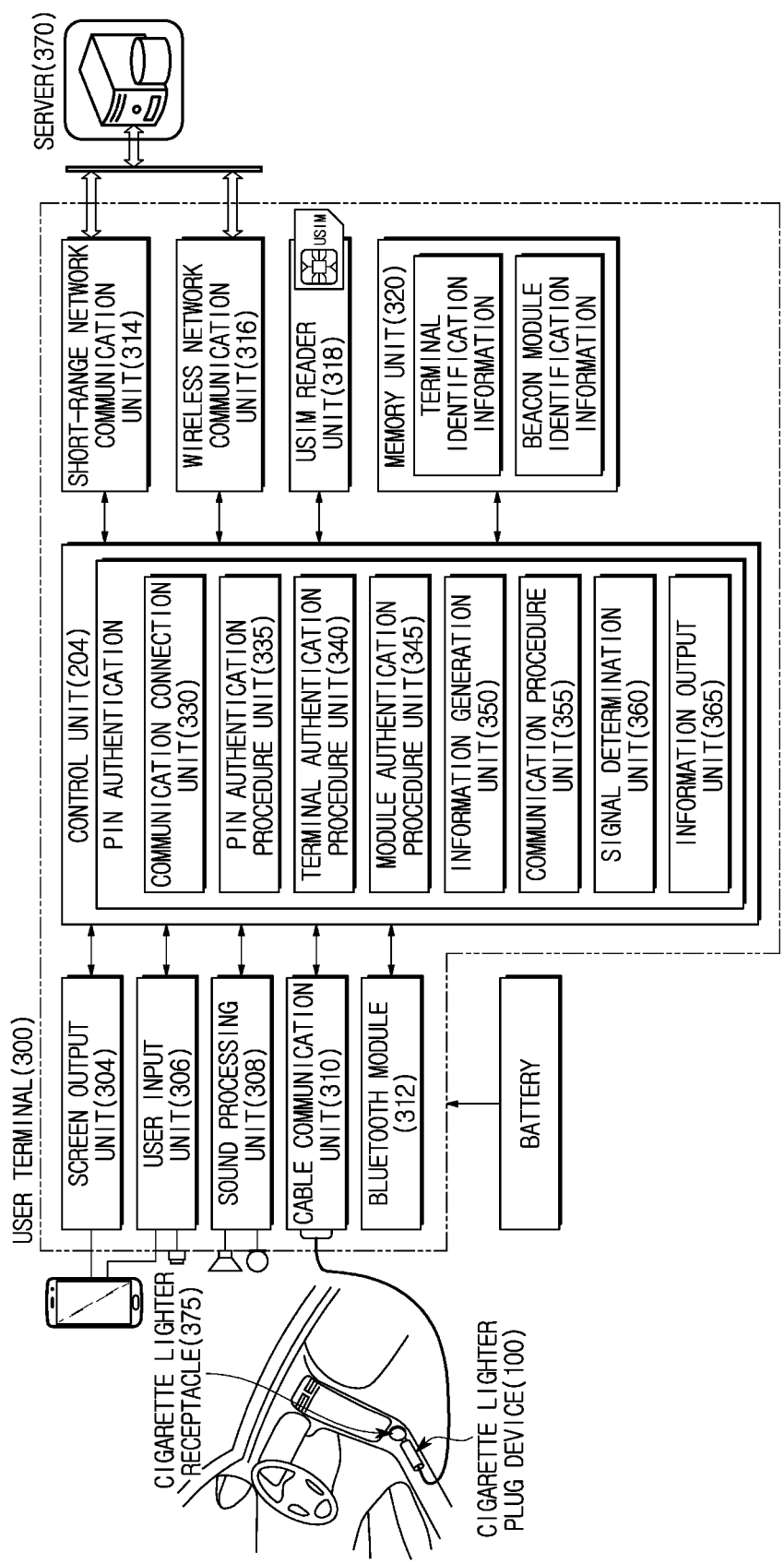
FIG. 3 is a diagram showing functional configurations of a user terminal and a program according to an embodiment of the present invention.

FIG. 3 is a diagram showing functional configurations of the user terminal 300 and the program 325 according to an embodiment of the present invention.

Referring to FIG. 3, the user terminal 300 includes a control unit 302, a memory unit 320, a screen output unit 304, a user input unit 306, a sound processing unit 308, a cable communication unit 310, a Bluetooth module 312, a short-range network communication unit 314, a wireless network communication unit 316, a universal subscriber identity module (USIM) reader unit 318, a USIM, and a battery for supplying power.

The control unit 302 collectively refers to an element that is configured to control operation of the user terminal 300. The control unit 302 includes at least one processor and at least one execution memory and is connected with the elements included in the user terminal 300 via a bus. According to the present invention, the control unit 302 loads at least one piece of program code included in the user terminal 300 and calculates the loaded program code through the processor, and the control unit 302 delivers a result of the calculation to at least one of the elements via the bus and controls operation of the user terminal 300. For convenience, the configuration of the program 325 of the present invention implemented as program code will be shown in the control unit 302 and described below.

The memory unit 320 collectively refers to a non-volatile memory corresponding to resources stored in the user terminal 300. The memory unit 320 stores and maintains at least one piece of program code executed through the control unit 302 and at least one set of data used by the program code. By default, the memory unit 320 stores system program code and a set of system data corresponding to an operating system of the user terminal 300, communication program code and a set of communication data for processing wireless communication connection of the user terminal 300, and at least one piece of application program code and at least one set of application data. In addition, the memory unit 320 may store program code and a set of data corresponding to the program 325 of the present invention.

The screen output unit 304 is composed of a screen output device (e.g., a liquid crystal display (LCD)) and a driving module for driving the screen output device. Among various calculation results of the control unit 302, the screen output unit 304 interoperates with the control unit 302 to output a calculation result corresponding to a screen output to the screen output device.

The user input unit 306 is composed of one or more user input devices (e.g., a button, a keypad, a touchpad, and a touchscreen interoperating with the screen output unit 304) and a driving module for driving the user input devices. The user input unit 306 interoperates with the control unit 302 to input commands for instructing the control unit 302 to perform various calculations or input data needed by the control unit 302 to perform the calculations.

The sound processing unit 308 is composed of a speaker, a microphone, and a driving module for driving the speaker and the microphone. Among various calculation results of the control unit 302, the sound processing unit 308 decodes sound data corresponding to a sound output and outputs the decoded sound data through the speaker, or encodes sound signals input through the microphone and delivers the encoded sound signals to the control unit 302.

The cable communication unit 310 is an element configured to receive power or provide bidirectional USB data communication by using a wired cable. The power received through the wired cable is charged in the battery. The cable communication unit 310 determines whether bidirectional USB data communication is possible when the connection is made by cable and processes the bidirectional USB data communication by using the wired cable when the USB communication is possible.

The Bluetooth module 312 transmits or receives a Bluetooth-based radio frequency signal in a short range of about 10 m (in the maximum range of about 100 m) according to a Bluetooth communication standard. Preferably, the Bluetooth communication standard includes versions higher than the Bluetooth 4.0, but is not limited thereto. The Bluetooth module 312 may transmit or receive a Bluetooth-based radio frequency signal according to versions lower than Bluetooth 4.0. The Bluetooth module 312 may process bidirectional Bluetooth data communication with the beacon module 200 built in the cigarette lighter plug device 100.

The wireless network communication unit 316 and the short-range network communication unit 314 collectively refer to communication resources for connecting the user terminal 300 to a designated communication network. The wireless network communication unit 316 collectively refers to communication resources for connecting the user terminal 300 to a wireless communication network via a base station. The wireless network communication unit 316 includes at least an antenna for transmitting or receiving a radio frequency signal having a specific frequency hand, an RF module, a baseband module, and a signal processing module. The wireless network communication unit 316 is connected with the control unit 302 to transmit a calculation result corresponding to wireless communication among various calculation results of the control unit 302 or receive data over the wireless communication network and deliver the data to the control unit 302. Also, the wireless network communication unit 316 performs a procedure for connection, registration, communication, and handoff of the wireless communication. According to the present invention, the wireless network communication unit 316 may connect the user terminal 300 to a communication network including a communication channel and a data channel via an exchanger. In some cases, the wireless network communication unit 316 may connect the user terminal 300 to a data network for providing a packet-communication-based wireless network data communication (e.g., the Internet), not via the exchanger.

The short-range network communication unit 314 collectively refers to communication resources for establishing a communication session by using a radio frequency signal as communication means within a certain distance (e.g., 10 m) and connecting the user terminal to a communication network. Preferably, the short-range network communication unit 314 may connect the user terminal 300 to the communication network through at least WiFi communication, public wireless communication, and/or ultra-wideband (UWB) communication. According to an embodiment of the present invention, the short-range network communication unit 314 may be integrated with or separated from the wireless network communication unit 316. According to the present invention, the short-range network communication unit 314 connects the user terminal 300 to a data network for providing packet-communication-based short-range wireless data communication over a wireless access point (AP).

The USIM reader unit 318 collectively refers to an element for exchanging at least one set of data with a USIM mounted on or attachable to the user terminal 300 on the basis of the ISO/IEC 7816 standard. The set of data is exchanged through an application protocol data unit (APDU) in a half-duplex communication scheme.

The control unit 302 may download a program 325 interoperating with the beacon module 200 of the cigarette lighter plug device 100 and store data networks to which the communication resources are connectable in the memory unit 320. Subsequently, when the program 325 is executed, the control unit 302 may perform the operation according to the present invention.

Referring to FIG. 3, the program 325 of the user terminal 300 includes a communication establishment unit 330 for establishing bidirectional data communication with the beacon module 200 built in the cigarette lighter plug device 100 through at least bidirectional USB data communication performed by a cable connection with the USB connector unit 125 included in the cigarette lighter plug device 100 and bidirectional Bluetooth data communication using a Bluetooth communication function of the beacon module 200.

The communication establishment unit 330 checks a paired beacon module 200 through the Bluetooth module 312 and establishes bidirectional Bluetooth data communication with the paired beacon module 200 through the Bluetooth module 312.

When the cable communication unit 310 and the USB connector unit 125 of the cigarette lighter plug device 100 are connected by cable and a bidirectional USB data communication function of the beacon module 200 is activated, the communication establishment unit 330 may detect the beacon module 200 built in the cigarette lighter plug device 100 through bidirectional USB data communication using the cable and may establish the bidirectional USB data communication with the beacon module 200.

According to an embodiment of the present invention, when the communication establishment unit 330 is paired with the beacon module 200 of the cigarette lighter plug device 100 through the Bluetooth module 312, the communication establishment unit 330 preferentially establishes bidirectional Bluetooth data communication with the beacon module 200. When the bidirectional Bluetooth data communication is not possible, the communication establishment unit 330 may selectively establish bidirectional USB data communication with the beacon module 200.

Referring to FIG. 3, the program 325 of the user terminal 300 includes a PIN authentication procedure unit 335 configured to perform a procedure of registering PIN authentication information in the beacon module 200 of the cigarette lighter plug device 100 and/or a PIN authentication procedure using the PIN authentication information of the beacon module 200.

When at least one of bidirectional Bluetooth data communication and bidirectional USB data communication is established with the beacon module 200 of the cigarette lighter plug device 100 through the communication establishment unit 330, and valid PIN authentication information is not registered in a PIN storage region of the beacon module 200, the PIN authentication procedure unit 335 may perform a procedure of registering the PIN authentication information in the beacon module 200, with which the bidirectional data communication is established.

When the PIN authentication information is registered in the beacon module 200, with which the bidirectional data communication is established, the PIN authentication procedure unit 335 may receive PIN information from a user and perform a PIN authentication procedure using the PIN authentication information of the beacon module 200 in order to add/renew a user terminal 300 according to a designated scenario, change importable settings of the beacon module 200 or initialize the settings of the beacon module 200.

Referring to FIG. 3, the program 325 of the user terminal 300 includes a terminal authentication procedure unit 340 configured to perform a procedure of registering terminal identification information of the user terminal 300 (or the program 325) in the beacon module 200 by using the bidirectional data communication when the terminal identification information of the user terminal 300 (or the program 325) is not registered in the beacon module 200 with which the bidirectional data communication is established and configured to perform a procedure of providing the terminal identification information to the beacon module 200 through the bidirectional data communication and authenticating validity of the user terminal 300 (or the program 325) through the beacon module 200 when the terminal identification information of the user terminal 300 (or the program 325) is registered in the beacon module 200 with which the bidirectional data communication is established.

When valid terminal identification information of the user terminal 300 is not registered in the beacon module 200 of the cigarette lighter plug device 100 with which the bidirectional data communication is established through the communication establishment unit 330 or when terminal identification information is added/renewed in the beacon module 200 as a result of the PIN authentication, the terminal authentication procedure unit 340 configures terminal identification information for uniquely identifying and authenticating the user terminal 300 (or the program 325) and provides the terminal identification information to the beacon module 200 of the cigarette lighter plug device 100, with which the bidirectional data communication is established. The beacon module 200 stores the terminal identification information in a designated identification information storage region.

When valid terminal identification information is registered in the beacon module 200 of the cigarette lighter plug device 100 with which the bidirectional data communication is established through the communication establishment unit 330, the terminal authentication procedure unit 340 provides the terminal identification information for authenticating validity of the user terminal 300 (or the program 325) to the beacon module 200 of the cigarette lighter plug device 100 with which the bidirectional data communication is established. The beacon module 200 authenticates the validity of the terminal identification information by using the terminal identification information registered in the designated identification information storage region and transmits a result of the authentication as a response.

According to an embodiment of the present invention, when the beacon module 200 of the cigarette lighter plug device 100 authenticates the validity of the user terminal 300 (or the program 325) through the terminal identification information, it is possible to transmit or receive various kinds of information or data through the bidirectional data communication between the beacon module 200 and the user terminal 300.

Referring to FIG. 3, the program 325 of the user terminal 300 includes a module authentication procedure unit 345 configured to perform a procedure of registering beacon module identification information of the beacon module 200 built in the cigarette lighter plug device 100 in the memory unit 320 of the user terminal 300 by using the bidirectional data communication when the beacon module identification information of the beacon module 200 is not registered in the memory unit 320 of the user terminal 300 and configured to perform a procedure of receiving the beacon module identification information of the beacon module 200 built in the cigarette lighter plug device 100 through the bidirectional data communication and authenticate validity of the beacon module 200 when the beacon module identification information of the beacon module 200 is registered in the memory unit 320 of the user terminal 300.

When the beacon module identification information for uniquely identifying and authenticating the beacon module 200 of the cigarette lighter plug device 100 is not stored in a designated storage region of the user terminal 300, the module authentication procedure unit 345 receives beacon module identification information of the beacon module 200 from the beacon module 200 with which the bidirectional data communication is established or generates beacon module identification information for uniquely identifying and authenticating the beacon module 200 with which the bidirectional data communication is established, provides the generated beacon module identification information to the beacon module 200, and stores the generated beacon module identification information in the designated storage region. Preferably, the beacon module identification information may be encrypted and stored.

When the beacon module identification information is stored in the designated storage region of the user terminal 300, the module authentication procedure unit 345 receives beacon module identification information from the beacon module 200 of the cigarette lighter plug device 100, with which the bidirectional data communication is established, and authenticates validity of the received beacon module identification information by using the beacon module identification information stored in the designated storage region.

According to an embodiment of the present invention, when the module authentication procedure unit 345 authenticates the validity of the beacon module 200 of the cigarette lighter plug device 100 with which the bidirectional data communication is established by using the beacon module identification information, it is possible to transmit or receive various kinds of information or data through the bidirectional data communication between the beacon module 200 and the user terminal 300.

Referring to FIG. 3, the program 325 of the user terminal 300 may include an information generation unit 350 configured to generate setting information for controlling broadcast of a use-specific beacon signal through the beacon module 200 of the cigarette lighter plug device 100 with which the bidirectional data communication is established and a communication procedure unit 355 configured to provide the setting information to the beacon module 200 of the cigarette lighter plug device 100 through the bidirectional data communication. When the authentication procedures performed through the terminal authentication procedure unit 340 and/or the module authentication procedure unit 345 is successful, the communication procedure unit 355 performs a procedure of transmitting or receiving various kinds of information or data to or from the beacon module 200 of the cigarette lighter plug device 100.

Before, while, or after the communication is established with the beacon module 200 of the cigarette lighter plug device 100 through the communication establishment unit 330, the information generation unit 350 generates the setting information for controlling broadcast of the use-specific beacon signal through the beacon module 200 of the cigarette lighter plug device 100 by using at least one or a combination of information input from a user and information received from a designated server 370.

When the setting information for controlling broadcast of the use-specific beacon signal through the beacon module 200 of the cigarette lighter plug device 100 is generated by the information generation unit 350, the communication procedure unit 355 provides the setting information to the beacon module 200 of the cigarette lighter plug device 100 with which the bidirectional data communication is established, and the beacon module 200 performs control to broadcast a use-specific beacon signal corresponding to the setting information.

Referring to FIG. 3, the program 325 of the user terminal 300 includes a communication procedure unit 355 configured to receive beacon transmission information for identifying any one of a default beacon signal and a use-specific beacon signal from the beacon module 200 of the cigarette lighter plug device 100 when the setting information is provided to the beacon module 200 of the cigarette lighter plug device 100, a signal determination unit 360 configured to read the beacon transmission information and determine whether a use-specific beacon signal corresponding to the setting information is being broadcast through the beacon module 200, and an information output unit 365 configured to output information indicating that the use-specific beacon signal is being broadcast or indicating that the broadcasting is stopped.

According to a first beacon determination embodiment of the present invention, when the setting information is provided to the beacon module 200 of the cigarette lighter plug device 100, the communication procedure unit 355 receives beacon transmission information for determining whether the default beacon signal or the use-specific beacon signal corresponding to the setting information is being broadcast through the beacon module 200 of the cigarette lighter plug device 100, and the signal determination unit 360 reads the received beacon transmission information and determines whether the default beacon signal or the use-specific beacon signal corresponding to the setting information is being broadcast through the beacon module 200.

When a result of reading the beacon transmission information is that the default beacon signal is being broadcast through the beacon module 200 of the cigarette lighter plug device 100, the information output unit 365 outputs information corresponding to the broadcast of the default beacon signal (or the stop of the broadcasting of the use-specific beacon signal). When a result of reading the beacon transmission information is that the use-specific beacon signal corresponding to the setting information is being broadcast through the beacon module 200 of the cigarette lighter plug device 100, the information output unit 365 outputs information corresponding to the broadcast of the use-specific beacon signal corresponding to the setting information.

When the setting information is provided to the beacon module 200 of the cigarette lighter plug device 100, but the use-specific beacon signal is not transmitted through the beacon module 200, the communication procedure unit 355 may provide the setting information for broadcasting the use-specific beacon signal to the beacon module 200 of the cigarette lighter plug device 100 through the bidirectional data communication again.

According to a second beacon determination embodiment of the present invention, when the setting information is provided to the beacon module 200 of the cigarette lighter plug device 100, the signal determination unit 360 may interoperate with the Bluetooth module 312 to check a beacon signal transmitted through the beacon module 200 of the cigarette lighter plug device 100 and received by the Bluetooth module 312 (e.g., the beacon signal being capable of being transmitted without pairing and even being received by the Bluetooth module 312 of the user terminal 300), read the beacon signal transmitted through the beacon module 200, and determine whether the default beacon signal or the use-specific beacon signal corresponding to the setting information is being broadcast through the beacon module 200.

When a result of reading the beacon signal transmitted from the beacon module 200 is that the default beacon signal is being broadcast through the beacon module 200 of the cigarette lighter plug device 100, the information output unit 365 outputs information corresponding to the broadcast of the default beacon signal (or the stopping of the broadcast of the use-specific beacon signal). On the other hand, when a result of reading the beacon signal transmitted from the beacon module 200 is that the use-specific beacon signal corresponding to the setting information is being broadcast through the beacon module 200 of the cigarette lighter plug device 100, the information output unit 365 outputs information corresponding to the broadcast of the use-specific beacon signal corresponding to the setting information.

When the setting information is provided to the beacon module 200 of the cigarette lighter plug device 100, but the use-specific beacon signal is not transmitted through the beacon module 200, the communication procedure unit 355 may provide the setting information for broadcasting the use-specific beacon signal to the beacon module 200 of the cigarette lighter plug device 100 through the bidirectional data communication again.

According to a third beacon determination embodiment of the present invention, when bidirectional USB data communication is established between the beacon module 200 of the cigarette lighter plug device 100 and the user terminal 300 and the setting information is provided to the beacon module 200 through the bidirectional USB data communication, the signal determination unit 360 checks whether a cable is removed from the USB connector unit 125 of the cigarette lighter plug device 100 to release a cable connection or whether the cable is removed from the cable communication unit 310 to release the cable connection.

According to an embodiment of the present invention, the beacon module 200 of the cigarette lighter plug device 100 may automatically stop broadcasting the use-specific beacon signal when the cable connection is released. In this case, when the cable connection is released, the signal determination unit 360 may determine to stop broadcasting the use-specific beacon signal corresponding to the setting information through the beacon module 200 of the cigarette lighter plug device 100, and the information output unit 365 may output information corresponding to the broadcast of the default beacon signal (or the stopping of the broadcast of the use-specific beacon signal).

As a modification of the third beacon determination embodiment, the signal determination unit 360 may check whether bidirectional USB data communication is possible between the beacon module 200 and the user terminal 300. When the beacon module is set to automatically stop broadcasting the use-specific beacon signal when the bidirectional USB data communication is not possible, the signal determination unit 360 may check whether bidirectional USB data communication between the beacon module 200 and the user terminal 300 is possible and may determine to stop broadcasting the use-specific beacon signal through the beacon module 200 when the bidirectional USB data communication is not possible, and the information output unit 365 may output information corresponding to the broadcast of the default beacon signal (or the stopping of the broadcast of the use-specific beacon signal).

According to a fourth beacon determination embodiment of the present invention, when bidirectional Bluetooth data communication is established between the beacon module 200 of the cigarette lighter plug device 100 and the user terminal 300 and the setting information is provided to the beacon module 200 through the bidirectional Bluetooth data communication, the signal determination unit 360 may check whether the bidirectional Bluetooth data communication with the beacon module 200 is possible.

According to an embodiment of the present invention, the beacon module 200 of the cigarette lighter plug device 100 may automatically stop broadcasting the use-specific beacon signal when the bidirectional Bluetooth data communication is not possible. In this case, when the bidirectional Bluetooth data communication is not possible, the signal determination unit 360 may determine that the use-specific beacon signal corresponding to the setting information has stopped being broadcast through the beacon module 200 of the cigarette lighter plug device 100, and the information output unit 365 may output information corresponding to the broadcast of the default beacon signal (or the stop of the broadcasting of the use-specific beacon signal).

According to a fifth beacon determination embodiment of the present invention, the signal determination unit 360 may determine whether the default beacon signal is being broadcast through the beacon module 200 of the cigarette lighter plug device 100 (or whether the use-specific beacon signal corresponding to the setting information has stopped being broadcast) or whether the use-specific beacon signal corresponding to the setting information is being broadcast through the beacon module 200 of the cigarette lighter plug device 100, but is not limited thereto.

In another beacon determination embodiment of the present invention, the communication procedure unit 355 may configure transmission stop information for requesting the beacon module 200 of the cigarette lighter plug device 100 to stop broadcasting a use-specific beacon signal and provide the transmission stop information to the beacon module 200 according to a user's manipulation (or reception of information from a designated server 370), and the beacon module 200 may receive the transmission stop information and stop broadcasting the use-specific beacon signal on the basis of the transmission stop information.

Figure 4:
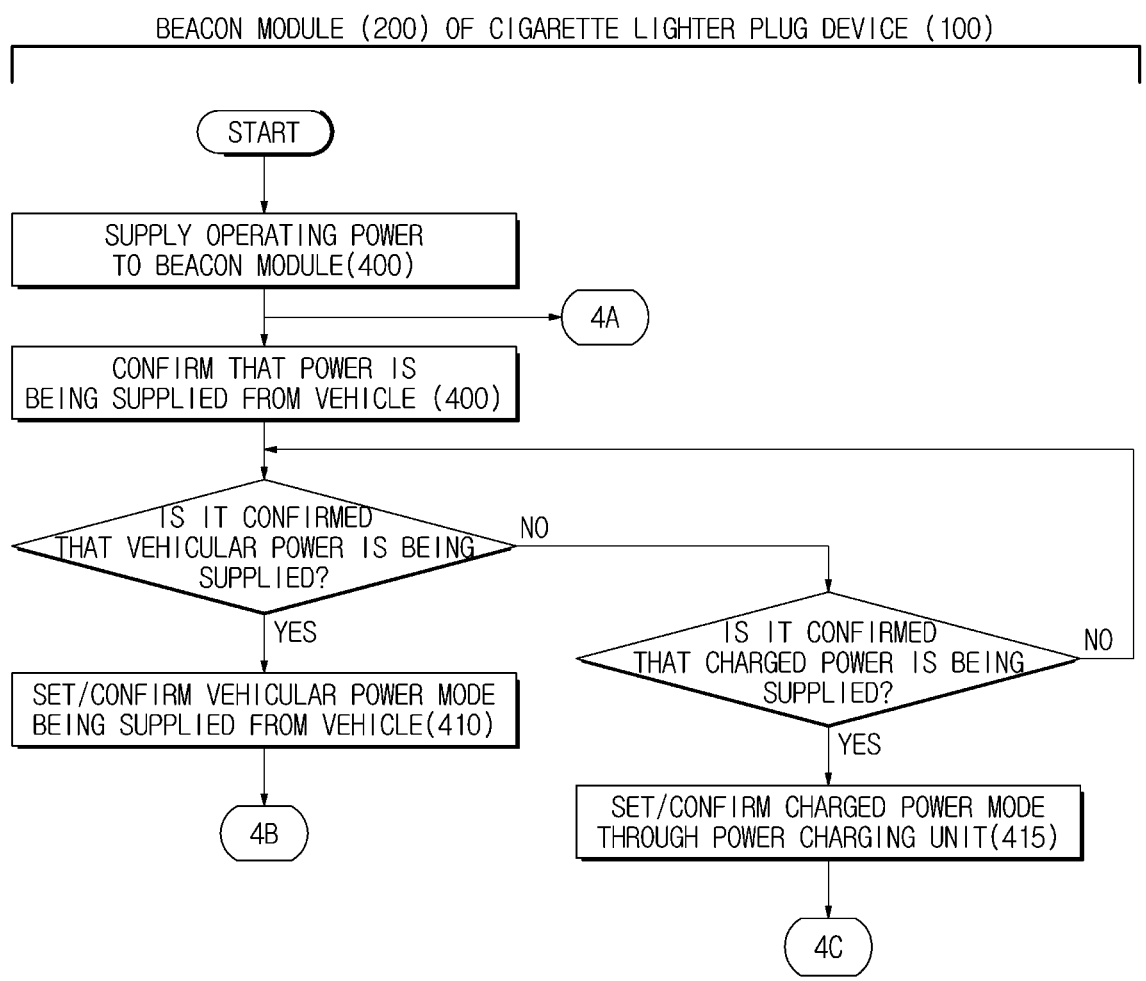
FIG. 4 is a diagram showing a mode setting/confirmation process of a beacon module according to an embodiment of the present invention.

FIG. 4 is a diagram showing a mode setting/checking process of the beacon module 200 according to an embodiment of the present invention.

Specifically, FIG. 4 shows a process of automatically setting/switching the operation mode of the beacon module 200 built in the cigarette lighter plug device 100 to the vehicular power supply mode or the charged power supply mode depending on supply of vehicular power or supply of charged power. Various embodiments of the mode setting/ checking process for the beacon module 200 (e.g., an embodiment in which some steps are omitted or steps are performed in a different order) can be readily inferred by those skilled in the art referencing and/or modifying FIG. 4. However, the present invention is intended to cover all of the inferred embodiments, and the technical features of the present invention are not limited to only the embodiment shown in FIG. 4.

Referring to FIG. 4, when operating power is being supplied to the beacon module 200 built in the cigarette lighter plug device 100 (400), the beacon module 200 checks whether power is being supplied from a vehicle (405). When power is being supplied from the vehicle, the beacon module 200 sets or confirms the operation mode to or as the vehicular power mode (410).

When the operating power is not supplied from the vehicle, but power charged in the power charging unit 130 is being supplied, the beacon module 200 sets or confirms the operation mode to or as the charged power mode (415).

Figure 5A:
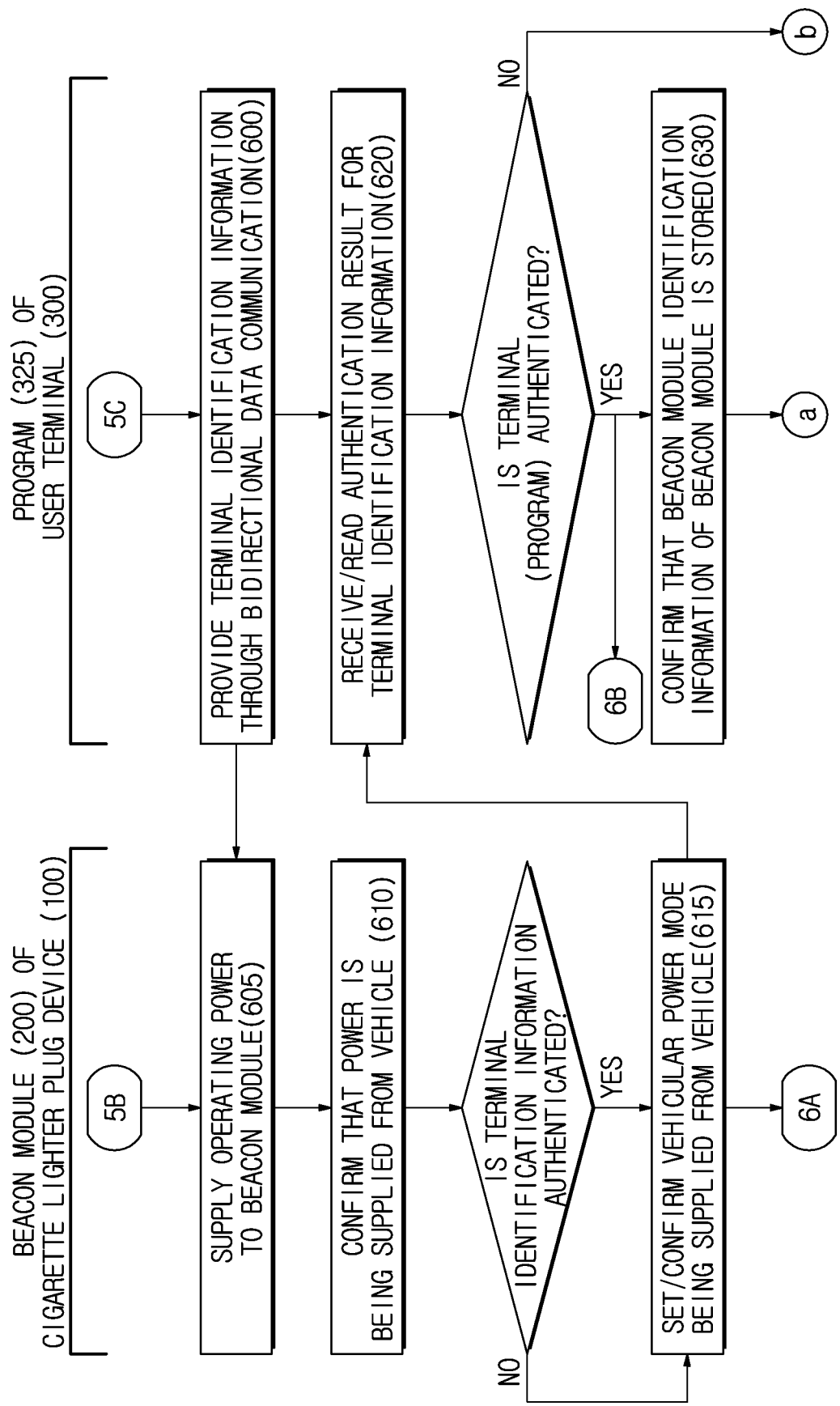
FIG. 5a and FIG. 5b is a diagram showing a process of registering terminal identification information and beacon module identification information according to an embodiment of the present invention.
Figure 5B:
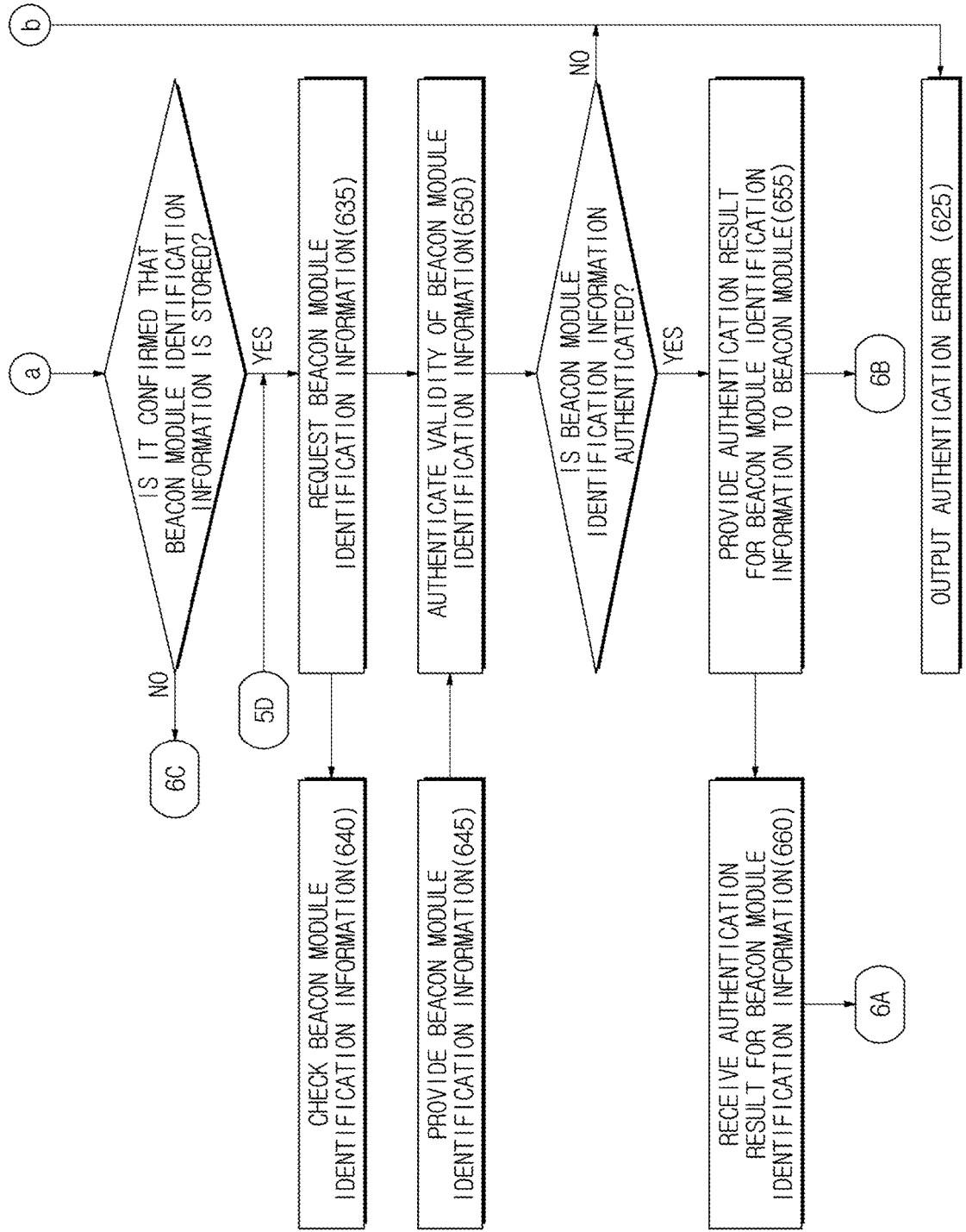

FIG. 5 is a diagram showing a process of registering terminal identification information and beacon module identification information according to an embodiment of the present invention.

Specifically, FIG. 5 shows a process of registering terminal identification information of the user terminal 300 in the identification information storage region of the beacon module 200 when at least one of bidirectional Bluetooth data communication and bidirectional USB data communication is established between the beacon module 200 of the cigarette lighter plug device 100 and the user terminal 300. Various embodiments of the terminal identification information registration process checking process (e.g., an embodiment in which some steps are omitted or steps are performed in a different order) can be readily inferred by those skilled in the art referencing and/or modifying FIG. 5. However, the present invention is intended to cover all of the inferred embodiments, and technical features thereof are not limited to only the embodiment shown in FIG. 5.

Referring to FIG. 5, the beacon module 200 of the cigarette lighter plug device 100 checks communication established with the user terminal 300 through at least bidirectional USB data communication or bidirectional Bluetooth data communication while the beacon module 200 operates with the vehicular power or the power charged in the power charging unit 130 (500), and the program 325 of the user terminal 300 checks communication established with the beacon module 200 of the cigarette lighter plug device 100 through at least the bidirectional USB data communication or the bidirectional Bluetooth data communication (500).

When the bidirectional data communication is established between the beacon module 200 and the user terminal 300, the beacon module 200 checks whether valid terminal identification information is registered in the designated identification information storage region. When valid terminal identification information is not registered in the identification information storage region, the beacon module 200 may request terminal identification information from the user terminal 300 through the bidirectional data communication.

According to another embodiment of the present invention, when directional data communication is established with the beacon module 200, the program 325 of the user terminal 300 checks whether valid terminal identification information of the user terminal 300 (or the program 325) is registered in the beacon module 200 (515). When the program 325 is first executed or there is no history about previously registered terminal identification information, the program 325 of the user terminal 300 may confirm that valid terminal identification information is not registered in the beacon module 200.

When the terminal identification information is requested by beacon module 200 or when the program 325 of the user terminal 300 determines that its own valid terminal identification information is not registered in the beacon module 200, the program 325 of the user terminal 300 configures valid terminal identification information of the user terminal 300 (or the program 325) (520) and performs a procedure of providing the terminal identification information to the beacon module 200 through the bidirectional data communication (525). The beacon module 200 receives the terminal identification information through the bidirectional data communication and stores the terminal identification information in the identification information storage region (530).

According to another embodiment of the present invention, when valid terminal identification information is registered in the identification information storage region of the beacon module 200 and the terminal identification information in the identification information storage region is renewed or added, the terminal identification information may be registered in the beacon module 200 after a PIN authentication procedure is performed using PIN authentication information registered in the PIN storage region of the beacon module through a user terminal 300 corresponding to the valid terminal identification information registered in the identification information storage region of the beacon module 200.

When the terminal identification information is registered in the beacon module 200 or when bidirectional data communication is established with the beacon module 200, the program 325 of the user terminal 300 checks whether beacon module identification information of the beacon module 200 is stored in the memory unit 320 of the user terminal 300 (535). When the beacon module identification information is not stored, the program 325 of the user terminal 300 may request and check beacon module identification information registered in the beacon module 200 through the bidirectional data communication (540), and the beacon module 200 may provide the registered beacon module identification information to the user terminal 300 through the bidirectional data communication in response to the request from the user terminal 300 (540). According to another embodiment of the present invention, the program 325 of the user terminal 300 may determine predetermined beacon module identification information to be set in the beacon module 200 and provide the beacon module identification information to the beacon module 200 through the bidirectional data communication (540), and the beacon module 200 may receive the beacon module identification information through the bidirectional data communication and store the received beacon module identification information (540). The program 325 of the user terminal 300 stores the beacon module identification information registered/set in the beacon module 200 in the memory unit 320 (545).

Figure 6A:
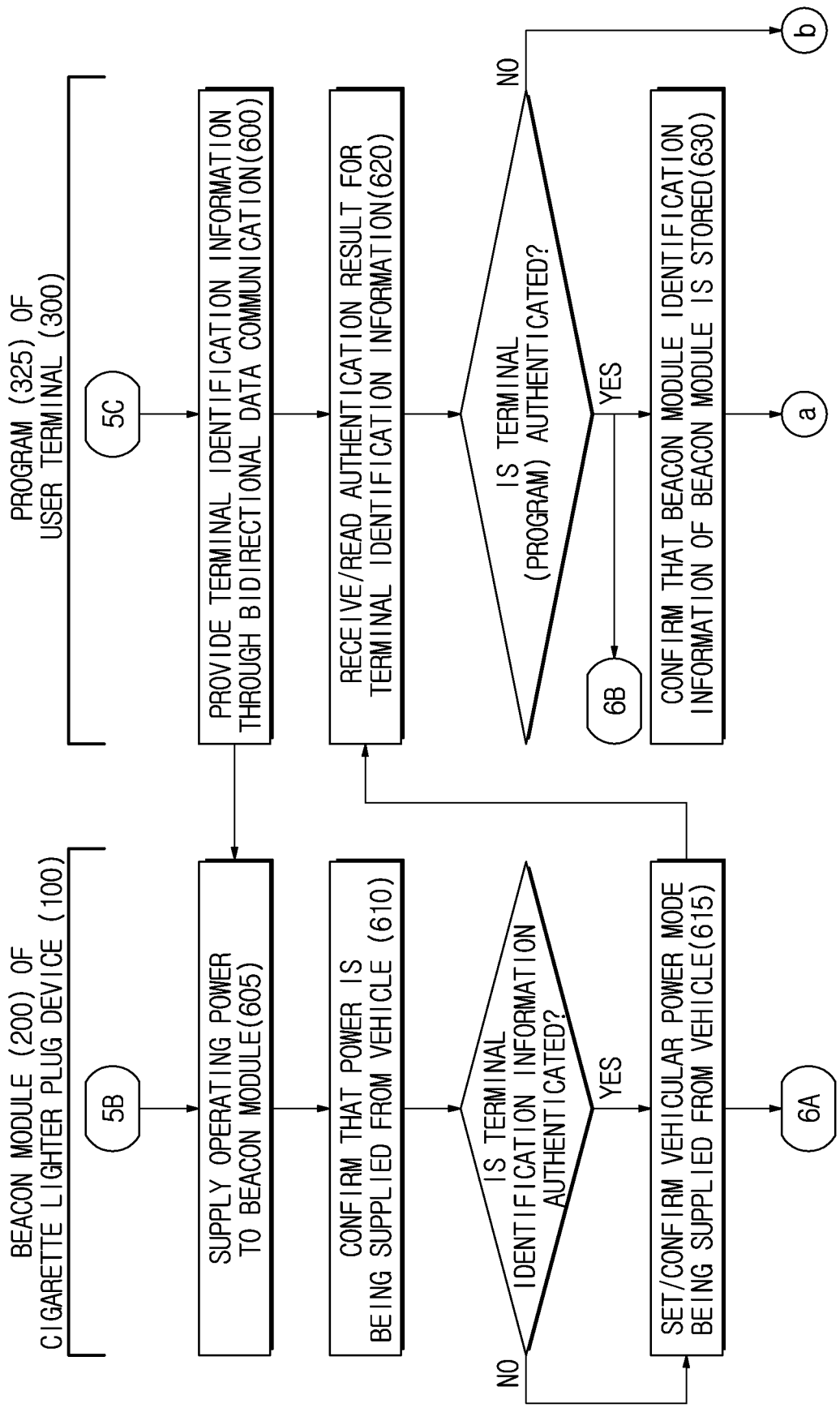
FIG. 6a and FIG. 6b is a diagram showing a terminal authentication process and a beacon module authentication process according to an embodiment of the present invention.
Figure 6B:
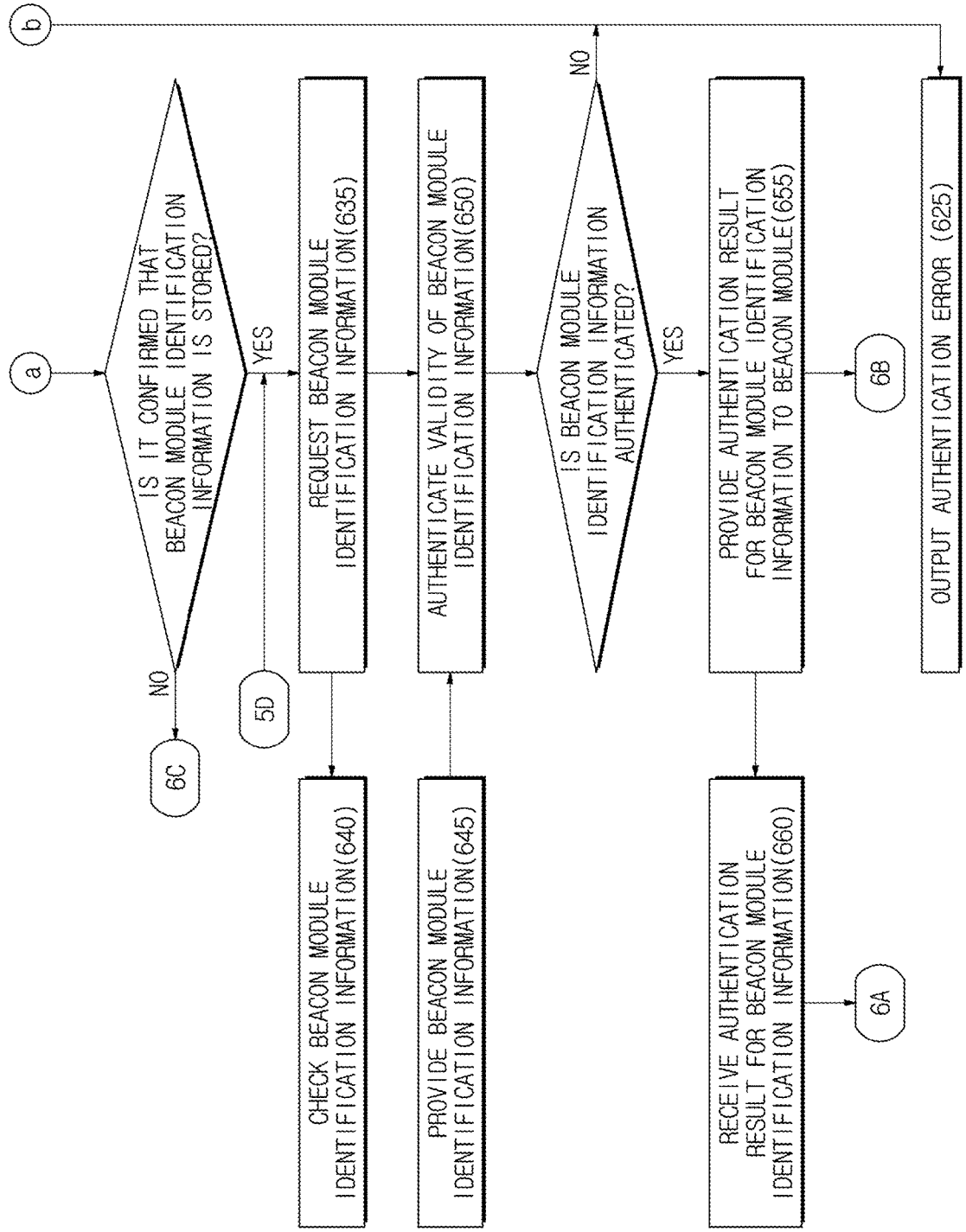

FIG. 6 is a diagram showing a process of authenticating the user terminal 300 and a process of authenticating the beacon module 200 according to an embodiment of the present invention.

Specifically, FIG. 6 shows a process of performing mutual authentication between the program 325 of the user terminal and the beacon module 200 by using various kinds of information when valid terminal identification information of the user terminal 300 and valid beacon module identification information of the beacon module 200 is registered in the beacon module 200 of the cigarette lighter plug device 100 and the user terminal 300 through the process shown in FIG. 5, respectively. Various embodiments of the processes of authenticating the user terminal 300 and the beacon module 200 (e.g., an embodiment in which some steps are omitted or steps are performed in a different order) can be readily inferred by those skilled in the art referencing and/or modifying FIG. 6. However, the present invention is intended to cover all of the inferred embodiments, and technical features thereof are not limited to only the embodiment shown in FIG. 6.

Referring to FIG. 6, when valid terminal identification information of the user terminal 300 (or the program 325) is registered in the beacon module 200 of the cigarette lighter plug device 100, the program 325 of the user terminal 300 provides terminal identification information for uniquely identifying and authenticating the user terminal 300 (or the program 325) to the beacon module 200 through bidirectional data communication (600), and the beacon module 200 receives the terminal identification information from the program 325 of the user terminal 300 through bidirectional data communication (605).

The beacon module 200 authenticates validity of the terminal identification information received from the user terminal 300 by using the terminal identification information registered in the identification information storage region (610). When the validity of the terminal identification information is not authenticated, the beacon module 200 provides a result of the authentication including an authentication error to the program 325 of the user terminal 300 (615). When the validity of the terminal identification information is authenticated, the beacon module 200 provides a result of the authentication corresponding to authentication success for the terminal authentication information to the program 325 of the user terminal 300 (615). When the validity of the terminal identification information is authenticated, the beacon module 200 may receive setting information for broadcasting a use-specific beacon signal from the program 325 of the authenticated user terminal 300.

The program 325 of the user terminal 300 receives and reads the result of the authentication of the terminal identification information (620). When the validity of the terminal identification information is not authenticated, the program 325 of the user terminal 300 outputs an authentication error (625). On the other hand, when the validity of the terminal identification information is authenticated, the program 325 of the user terminal 300 may provide setting information for controlling broadcast of a use-specific beacon signal through the beacon module 200.

The program 325 of the user terminal 300 checks whether beacon module identification information of the beacon module 200, with which the bidirectional data communication is established, is stored in a designated storage region of the user terminal 300 (630). When the beacon module identification information of the beacon module 200 is not stored, the program 325 of the user terminal 300 may perform a procedure of setting/registering the beacon module identification information through the process shown in FIG. 5. When the beacon module identification information of the beacon module 200 is stored in the designated storage region of the user terminal 300, the program 325 of the user terminal 300 requests beacon module identification information from the beacon module 200 through bidirectional data communication (635), and the beacon module 200 confirms the beacon module identification information (640) and provide the beacon module identification information to the program 325 of the user terminal 300 (645).

The program 325 of the user terminal 300 authenticates validity of the beacon module identification information received from the beacon module 200 by using the beacon module identification information stored in the designated storage region (650). When the validity of the beacon module identification information is not authenticated, the program 325 of the user terminal 300 outputs an authentication error (625).

When the validity of the beacon module identification information is authenticated, the program 325 of the user terminal 300 provides a result of the authentication of the beacon module identification information to the beacon module 200 (655). The beacon module 200 may receive the result of the authentication of the beacon module identification information from the program 325 of the user terminal 300 (660) and then receive setting information for broadcasting a use-specific beacon signal from the program 325 of the user terminal 300.

Figure 7A:
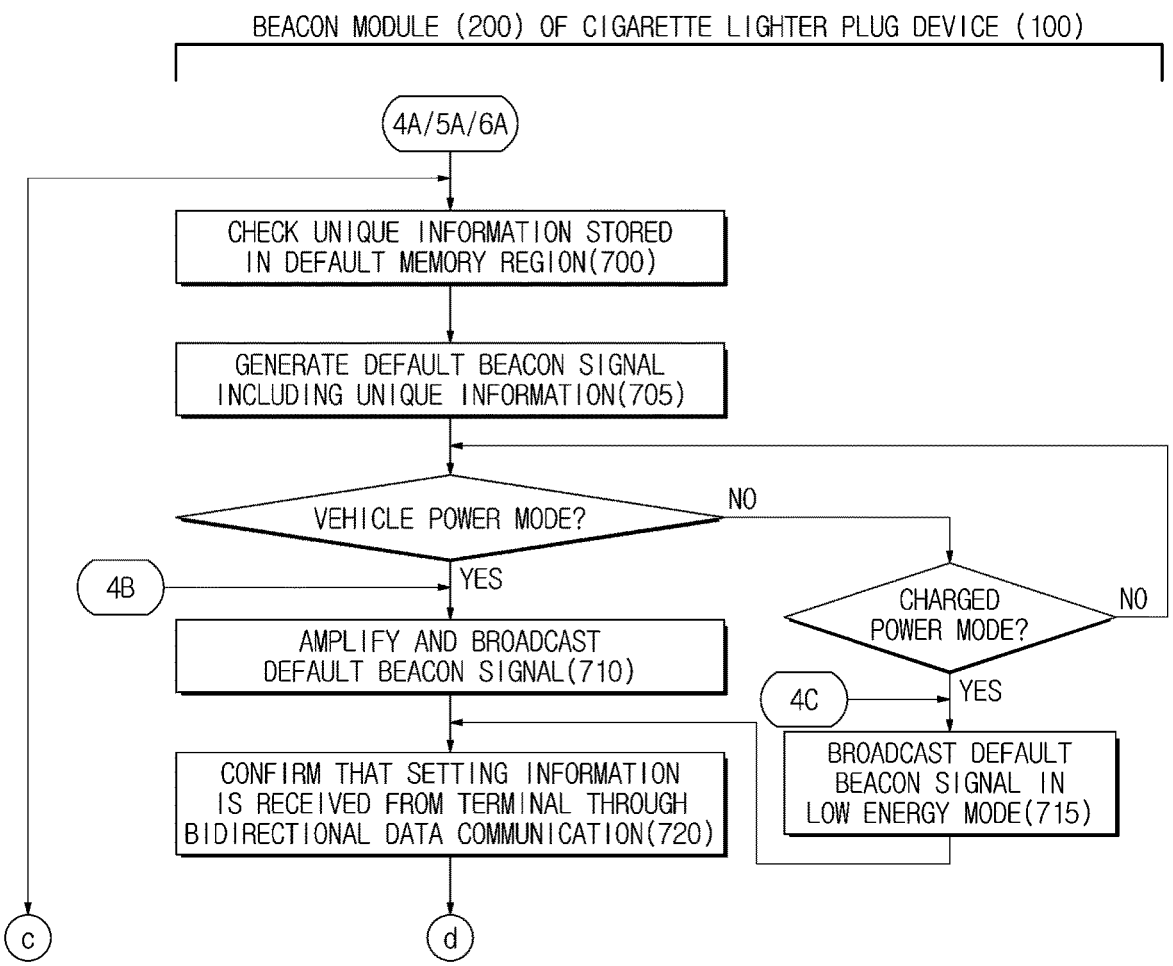
FIG. 7a and FIG. 7b is a diagram showing a beacon signal broadcasting process of a beacon module according to a first embodiment of the present invention.
Figure 7B:
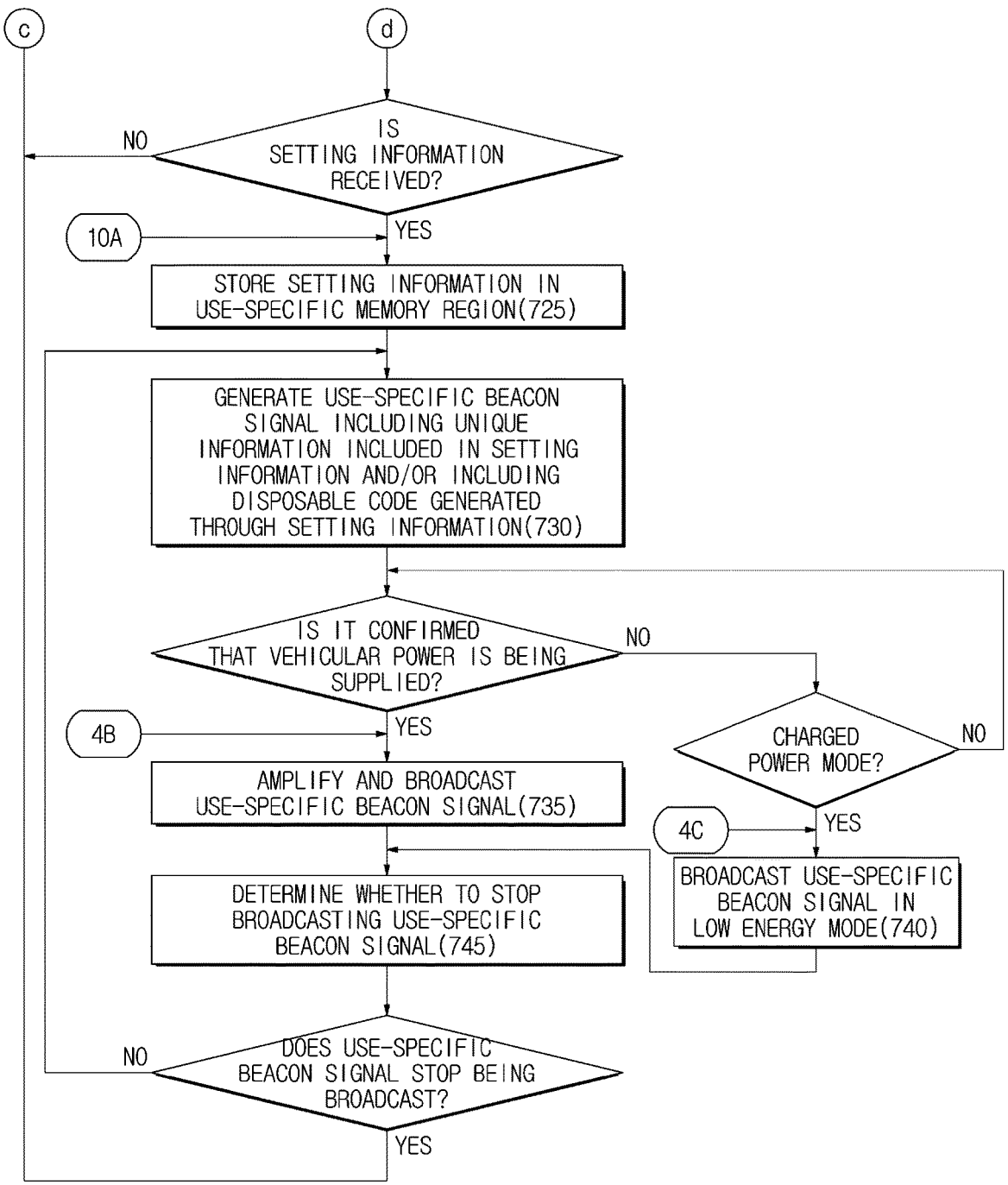

FIG. 7 is a diagram showing a beacon signal broadcasting process of the beacon module 200 according to a first embodiment of the present invention.

Specifically, FIG. 7 shows a process of selectively broadcasting a default beacon signal including unique information of the beacon module 200 according to a power supply state and broadcasting a use-specific beacon signal corresponding to setting information when the setting information is received from the program 325 of the user terminal 300 authenticated through the process shown in FIG. 6. Various embodiments of the beacon signal broadcasting process of the beacon module 200 (e.g., an embodiment in which some steps are omitted or steps are performed in a different order) can be readily inferred by those skilled in the art referencing and/or modifying FIG. 7. However, the present invention is intended to cover all of the inferred embodiments, and technical features thereof are not limited to only the embodiment shown in FIG. 7.

Referring to FIG. 7, when operating power is being supplied to the beacon module 200 built in the cigarette lighter plug device 100, the beacon module 200 checks unique information stored in a default memory region (700) and generates a default beacon signal including the unique information (705).

When the operation mode of the beacon module 200 is the vehicular power mode, in which the beacon module 200 receives power from the vehicle and operates with the power, the beacon module 200 amplifies the default beacon signal (e.g., to a pre-calculated power or the maximum available power) by using the power supplied from the vehicle and broadcasts the amplified default beacon signal (710).

When the operation mode of the beacon module 200 is the charged power mode, in which the beacon module 200 receives power charged in the power charging unit 130 and operates with the power, the beacon module 200 broadcasts the default beacon signal in the low-energy mode (715).

Figure 10:
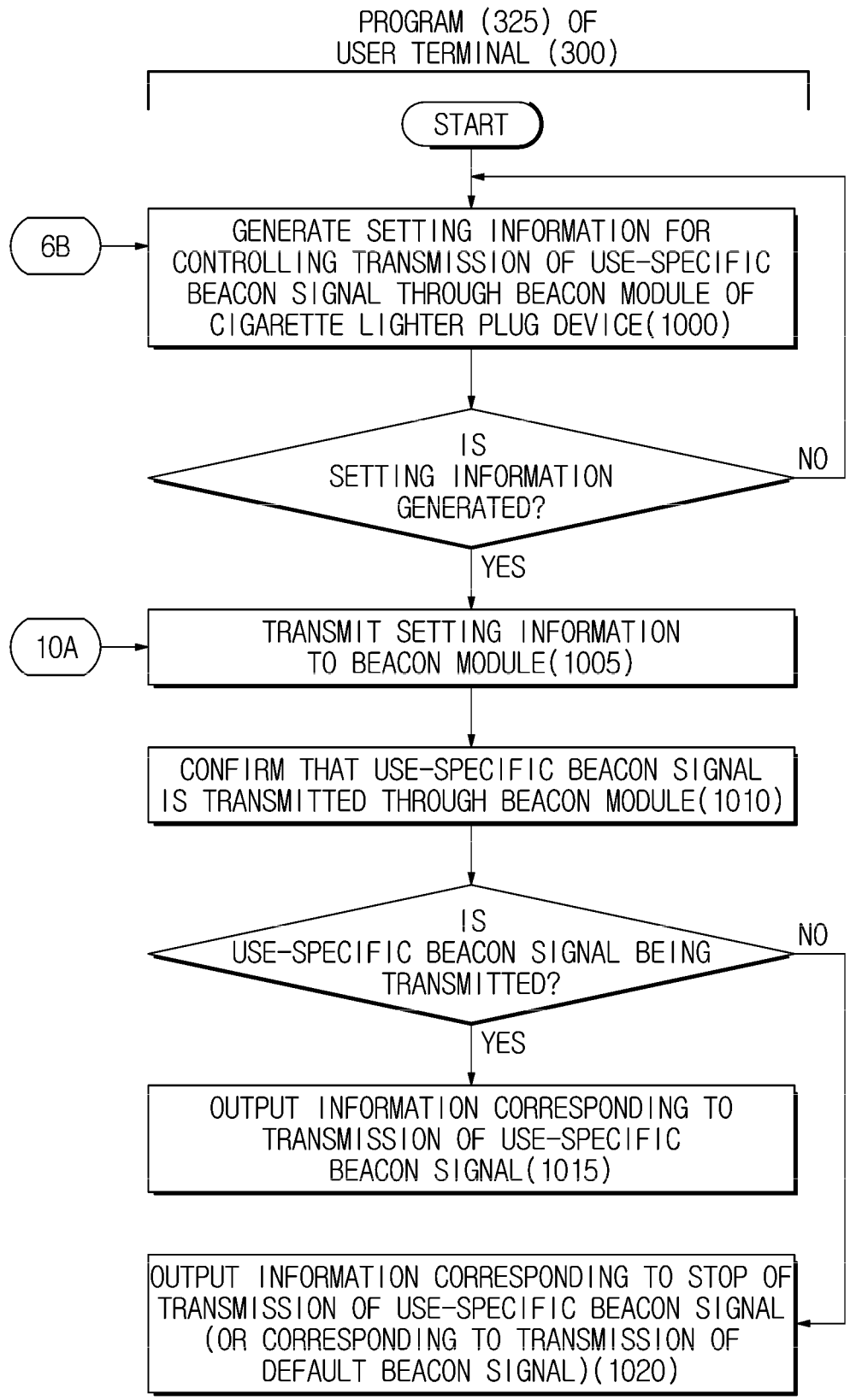
FIG. 10 is a diagram showing a process of providing setting information for broadcasting a use-specific beacon signal according to an embodiment of the present invention.

The beacon module 200 checks whether setting information generated through a process shown in FIG. 10 is received from the program 325 of the user terminal 300 authenticated through the process shown in FIG. 6 (720). When the setting information is not received, the beacon module 200 repeats the process of broadcasting the default beacon signal at least a predetermined number of times or periodically.

When the setting information is received from the program 325 of the authenticated user terminal 300, the beacon module 200 stores values/information included in the setting information in a designated use-specific memory region (725) and generates a use-specific beacon signal including unique information of the setting information and/or including disposable code dynamically generated using the values included in the setting information (730).

When the operation mode of the beacon module 200 is the vehicular power mode, in which the beacon module 200 receives power from the vehicle and operates with the power, the beacon module 200 amplifies the use-specific beacon signal (e.g., to a pre-calculated power or the maximum available power) by using the power supplied from the vehicle and broadcasts the amplified use-specific beacon signal (735).

When the operation mode of the beacon module 200 is the charged power mode, in which the beacon module 200 receives power charged in the power charging unit 130 and operates with the power, the beacon module 200 broadcasts the use-specific beacon signal in the low-energy mode (740).

The beacon module 200 determines whether to stop broadcasting the use-specific beacon signal while broadcasting the use-specific beacon signal (745). When it is determined not to stop broadcasting the use-specific beacon signal, the beacon module 200 repeats the process of broadcasting the use-specific beacon signal at least a predetermined number of times or periodically.

On the other hand, when it is determined to stop broadcasting the use-specific beacon signal, the beacon module 200 performs the process of broadcasting the default beacon signal.

Figure 8A:
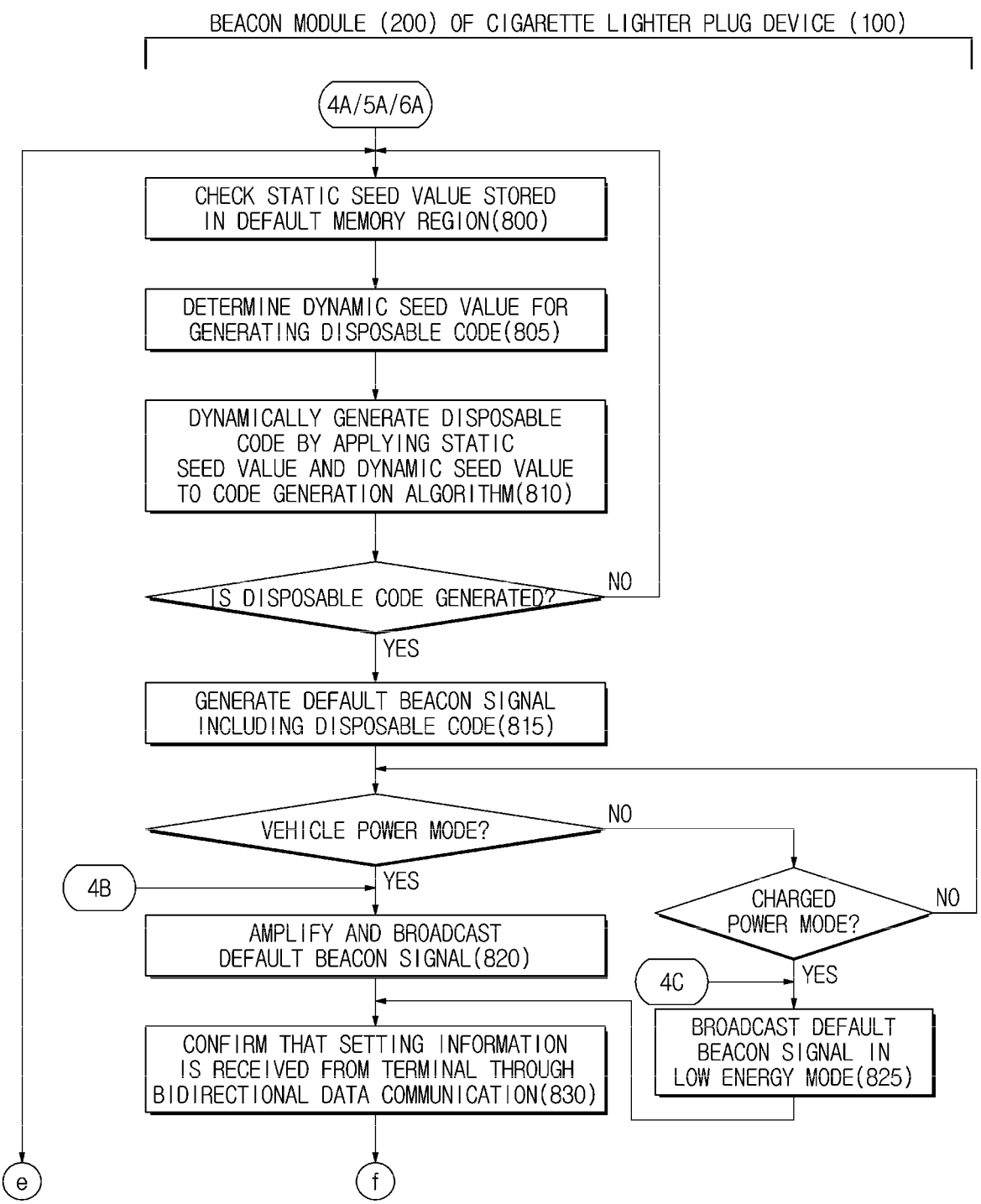
FIG. 8a and FIG. 8b is a diagram showing a beacon signal broadcasting process of a beacon module according to a second embodiment of the present invention.
Figure 8B:
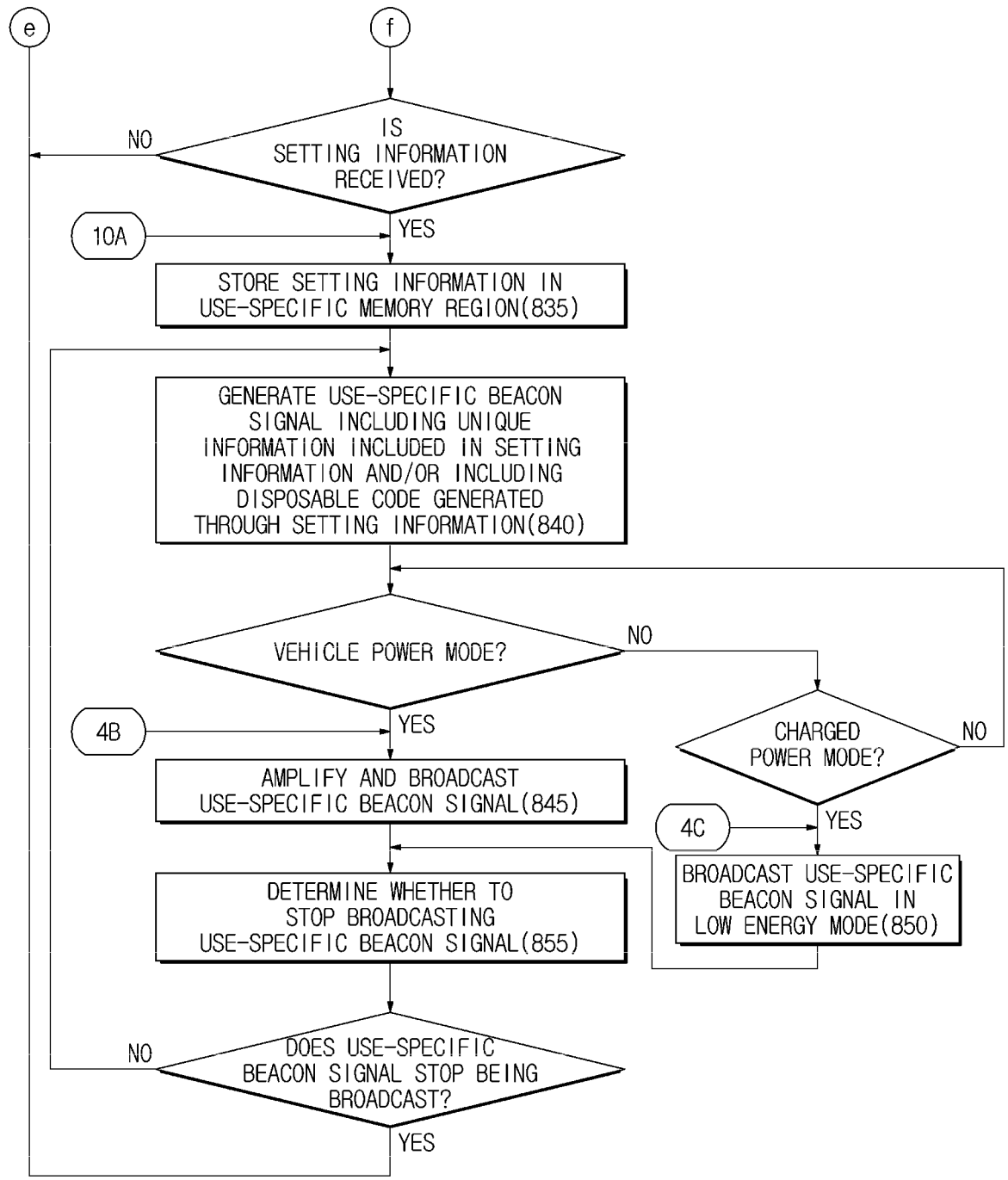

FIG. 8 is a diagram showing a beacon signal broadcasting process of the beacon module 200 according to a second embodiment of the present invention.

Specifically, FIG. 8 shows a process of selectively broadcasting a default beacon signal including disposable code generated by the beacon module 200 and broadcasting a use-specific beacon signal corresponding to setting information when the setting information is received from the program 325 of the user terminal 300 authenticated through the process shown in FIG. 6. Various embodiments of the beacon signal broadcasting process of the beacon module 200 (e.g., an embodiment in which some steps are omitted or steps are performed in a different order) can be readily inferred by those skilled in the art referencing and/or modifying FIG. 8. However, the present invention is intended to cover all of the inferred embodiments, and technical features thereof are not limited to only the embodiment shown in FIG. 8.

Referring to FIG. 8, when operating power is being supplied to the beacon module 200 built in the cigarette lighter plug device 100, the beacon module 200 checks one or more static seed value stored in a default memory region (800), determines at least one dynamic seed value for generating disposable code (805), and applies the one or more static seed values and the at least one dynamic seed value to a designated code generation algorithm to dynamically generate the disposable code (810). When the disposable code is generated, the beacon module 200 generates a default beacon signal including the disposable code (815).

When the operation mode of the beacon module 200 is the vehicular power mode, in which the beacon module 200 receives power from the vehicle and operates with the power, the beacon module 200 amplifies the default beacon signal (e.g., to a pre-calculated power or the maximum available power) by using the power supplied from the vehicle and broadcasts the amplified default beacon signal (820).

When the operation mode of the beacon module 200 is the charged power mode, in which the beacon module 200 receives power charged in the power charging unit 130 and operates with the power, the beacon module 200 broadcasts the default beacon signal in a low-energy mode (825).

The beacon module 200 checks whether setting information generated through a process shown in FIG. 10 is received from the program 325 of the user terminal 300 authenticated through the process shown in FIG. 6 (830). When the setting information is not received, the beacon module 200 repeats the process of broadcasting the default beacon signal at least a predetermined number of times or periodically.

When the setting information is received from the program 325 of the authenticated user terminal 300, the beacon module 200 stores values/information included in the setting information in a designated use-specific memory region (835) and generates a use-specific beacon signal including unique information of the setting information and/or including disposable code dynamically generated using the values included in the setting information (840).

When the operation mode of the beacon module 200 is the vehicular power mode, in which the beacon module 200 receives power from the vehicle and operates with the power, the beacon module 200 amplifies the use-specific beacon signal (e.g., to a pre-calculated power or the maximum available power) by using the power supplied from the vehicle and broadcasts the amplified use-specific beacon signal (845).

When the operation mode of the beacon module 200 is the charged power mode, in which the beacon module 200 receives power charged in the power charging unit 130 and operates with the power, the beacon module 200 broadcasts the use-specific beacon signal in the low-energy mode (850).

The beacon module 200 determines whether to stop broadcasting the use-specific beacon signal while broadcasting the use-specific beacon signal (855). When it is determined not to stop broadcasting the use-specific beacon signal, the beacon module 200 repeats the process of broadcasting the use-specific beacon signal at least a predetermined number of times or periodically.

On the other hand, when it is determined to stop broadcasting the use-specific beacon signal, the beacon module 200 performs the process of broadcasting the default beacon signal.

Figure 9A:
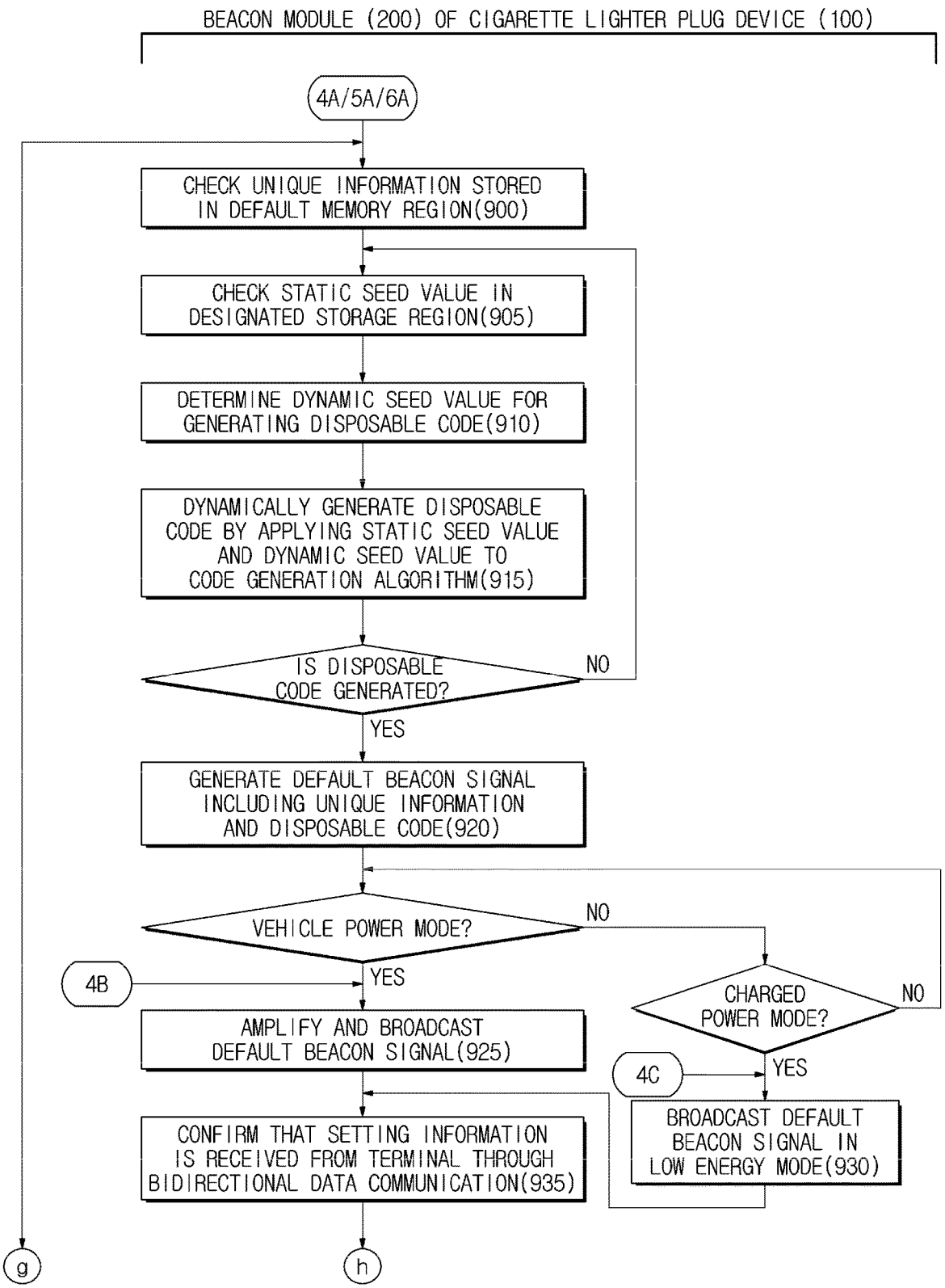
FIG. 9a and FIG. 9b is a diagram showing a beacon signal broadcasting process of a beacon module according to a third embodiment of the present invention.
Figure 9B:
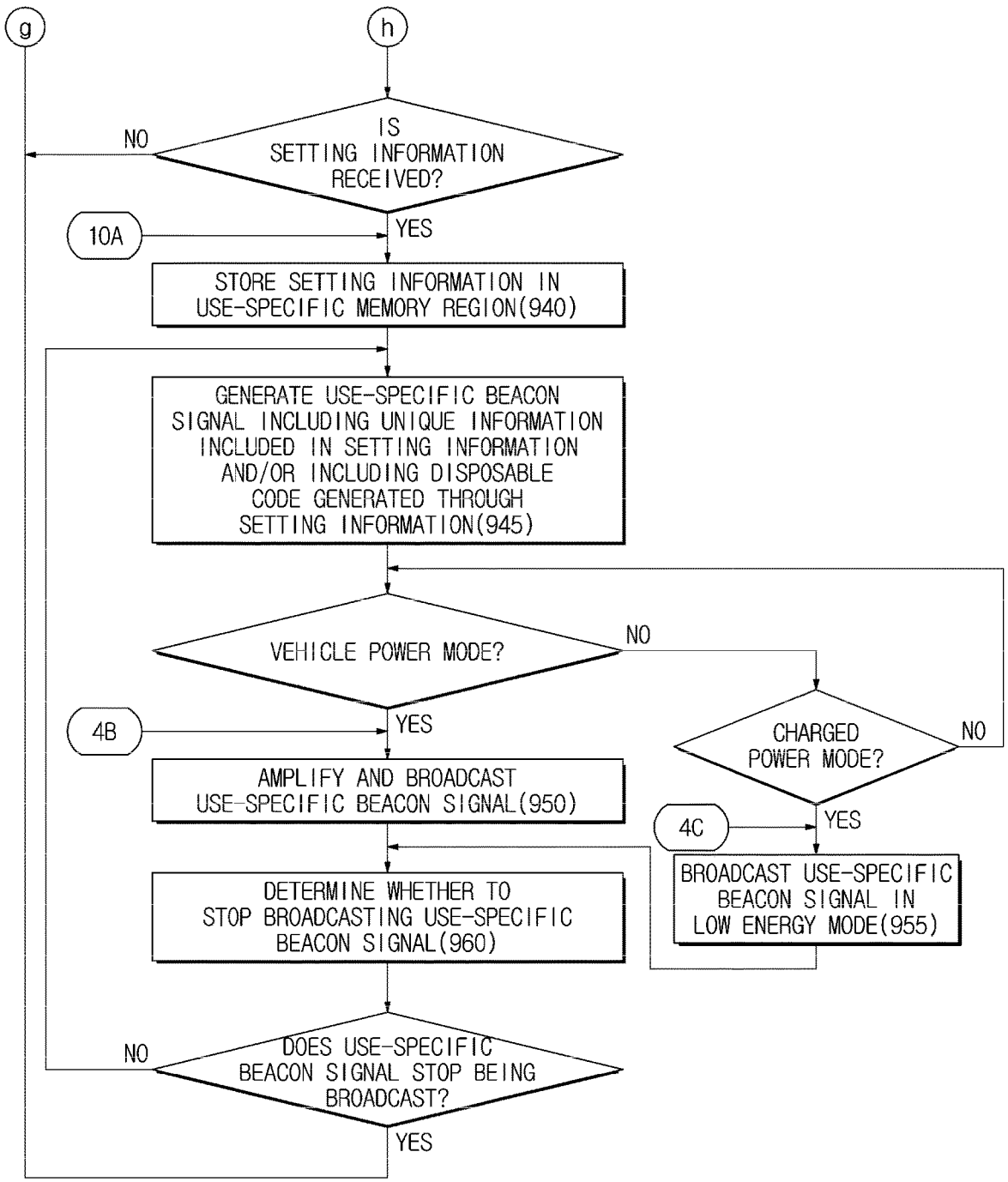

FIG. 9 is a diagram showing a beacon signal broadcasting process of the beacon module 200 according to a third embodiment of the present invention.

Specifically, FIG. 9 shows a process of selectively broadcasting a default beacon signal including unique information of the beacon module 200 and including disposable code generated by the beacon module 200 according to a power supply state and broadcasting a use-specific beacon signal corresponding to setting information when the setting information is received from the program 325 of the user terminal 300 authenticated through the process shown in FIG. 6. Various embodiments of the beacon signal broadcasting process of the beacon module 200 (e.g., an embodiment in which some steps are omitted or steps are performed in a different order) can be readily inferred by those skilled in the art referencing and/or modifying FIG. 9. However, the present invention is intended to cover all of the inferred embodiments, and technical features thereof are not limited to only the embodiment shown in FIG. 9.

Referring to FIG. 9, when operating power is being supplied to the beacon module 200 built in the cigarette lighter plug device 100, the beacon module 200 checks unique information stored in a default memory region (900). The beacon module 200 checks one or more static seed value stored in the default memory region (905), determines at least one dynamic seed value for generating disposable code (910), and applies the one or more static seed values and the at least one dynamic seed value to a designated code generation algorithm to dynamically generate the disposable code (915). When the disposable code is generated, the beacon module 200 generates a default beacon signal including the disposable code (920).

When the operation mode of the beacon module 200 is the vehicular power mode, in which the beacon module 200 receives power from the vehicle and operates with the power, the beacon module 200 amplifies the default beacon signal (e.g., to a pre-calculated power or the maximum available power) by using the power supplied from the vehicle and broadcasts the amplified default beacon signal (925).

When the operation mode of the beacon module 200 is the charged power mode, in which the beacon module 200 receives power charged in the power charging unit 130 and operates with the power, the beacon module 200 broadcasts the default beacon signal in the low-energy mode (930).

The beacon module 200 checks whether setting information generated through a process shown in FIG. 10 is received from the program 325 of the user terminal 300 authenticated through the process shown in FIG. 6 (935). When the setting information is not received, the beacon module 200 repeats the process of broadcasting the default beacon signal at least a predetermined number of times or periodically.

When the setting information is received from the program 325 of the authenticated user terminal 300, the beacon module 200 stores values/information included in the setting information in a designated use-specific memory region (940) and generates a use-specific beacon signal including unique information of the setting information and/or including disposable code dynamically generated using the values included in the setting information (945).

When the operation mode of the beacon module 200 is the vehicular power mode, in which the beacon module 200 receives power from the vehicle and operates with the power, the beacon module 200 amplifies the use-specific beacon signal (e.g., to a pre-calculated power or the maximum available power) by using the power supplied from the vehicle and broadcasts the amplified use-specific beacon signal (950).

When the operation mode of the beacon module 200 is the charged power mode, in which the beacon module 200 receives power charged in the power charging unit 130 and operates with the power, the beacon module 200 broadcasts the use-specific beacon signal in the low-energy mode (955).

The beacon module 200 determines whether to stop broadcasting the use-specific beacon signal while broadcasting the use-specific beacon signal (960). When it is determined not to stop broadcasting the use-specific beacon signal, the beacon module 200 repeats the process of broadcasting the use-specific beacon signal at least a predetermined number of times or periodically.

On the other hand, when it is determined to stop broadcasting the use-specific beacon signal, the beacon module 200 performs the process of broadcasting the default beacon signal.

FIG. 10 is a diagram showing a process of providing setting information for broadcasting a use-specific beacon signal according to an embodiment of the present invention.

Specifically, FIG. 10 shows a process of enabling the beacon module 200 to broadcast a use-specific beacon signal as shown in FIGS. 7 to 9 by the program 325 of the user terminal 300 which is authenticated through the process shown in FIG. 6, generating setting information and providing the setting information to the beacon module 200 of the cigarette lighter plug device 100. Various embodiments of the setting information providing process (e.g., an embodiment in which some steps are omitted or steps are performed in a different order) can be readily inferred by those skilled in the art referencing and/or modifying FIG. 10. However, the present invention is intended to cover all of the inferred embodiments, and technical features thereof are not limited to only the embodiment shown in FIG. 10.

Referring to FIG. 10, the program 325 of the user terminal 300 generates setting information for controlling broadcast of a use-specific beacon signal through the beacon module 200 of the cigarette lighter plug device 100. The program 325 of the user terminal 300 may generate the setting information before performing authentication through the process shown in FIG. 6. However, preferably, the program 325 of the user terminal 300 may generate the setting information after performing authentication through the process shown in FIG. 6. The setting information may be generated by at least one or a combination of information input through a user's manipulation and information received from a designated server 370.

When the setting information is generated, the program 325 of the user terminal 300 may provide the setting information to the beacon module 200 of the cigarette lighter plug device 100 with which communication is established (1005), and the beacon module 200 may broadcast a use-specific beacon signal corresponding to the setting information through the processes shown in FIGS. 7 to 9.

The program 325 of the user terminal 300 provides the setting information to the beacon module 200 and then checks whether the use-specific beacon signal corresponding to the setting information is being broadcast through the beacon module 200 (1010).

According to a first beacon determination embodiment of the present invention, the program 325 of the user terminal 300 may receive beacon transmission information for determining whether the default beacon signal or the use-specific beacon signal corresponding to the setting information is being broadcast through the beacon module 200 of the user terminal 300 from the beacon module 200, read the received beacon transmission information, and determine whether the default beacon signal or the use-specific beacon signal corresponding to the setting information is being broadcast through the beacon module 200.

According to a second beacon determination embodiment of the present invention, the program 325 of the user terminal 300 may interoperate with the Bluetooth module 312 of the user terminal 300 to check a beacon signal transmitted through the beacon module 200 of the cigarette lighter plug device 100 and received by the Bluetooth module 312 (e.g., the beacon signal being capable of being broadcast without pairing and even received by the Bluetooth module 312 of the user terminal 300), read the beacon signal transmitted through the beacon module 200, determine whether the default beacon signal or the use-specific beacon signal corresponding to the setting information is being broadcast through the beacon module 200.

According to a third beacon determination embodiment of the present invention, when bidirectional USB data communication is established between the beacon module 200 of the cigarette lighter plug device 100 and the user terminal 300, the program 325 of the user terminal 300 may check whether a cable connection is release by checking whether a cable is disconnected from the USB connector unit 125 of the cigarette lighter plug device 100 or from the cable communication unit 310. When the cable connection is released, the program 325 of the user terminal 300 may determine that the use-specific beacon signal corresponding to the setting information has stopped being broadcast through the beacon module 200 of the cigarette lighter plug device 100.

According to a fourth beacon determination embodiment of the present invention, the program 325 of the user terminal 300 may check whether bidirectional Bluetooth data communication with the beacon module 200 is possible. When the bidirectional Bluetooth data communication is not possible, the program 325 of the user terminal 300 may determine that the use-specific beacon signal corresponding to the setting information has stopped being broadcast through the beacon module 200 of the cigarette lighter plug device 100.

According to a fifth beacon determination embodiment of the present invention, the program 325 of the user terminal 300 may determine whether the default beacon signal is being broadcast through the beacon module 200 of the cigarette lighter plug device 100 (or whether to stop broadcasting the use-specific beacon signal) or whether the use-specific beacon signal corresponding to the setting information is being broadcast by combining the first to fourth beacon determination embodiments. However, the present invention is not limited thereto.

When it is determined that the use-specific beacon signal is being broadcast through the beacon module 200 of the cigarette lighter plug device 100 according to the first to fifth beacon determination embodiments, the program 325 of the user terminal 300 outputs information corresponding to the broadcast of the use-specific beacon signal (1015).

When it is determined to stop broadcasting the use-specific beacon signal through the beacon module 200 of the cigarette lighter plug device 100 according to the first to fifth beacon determination embodiments, the program 325 of the user terminal 300 outputs information corresponding to the stopping of the broadcast of the use-specific beacon signal (or corresponding to the broadcast of the default beacon signal) (1020).

Figure 11:
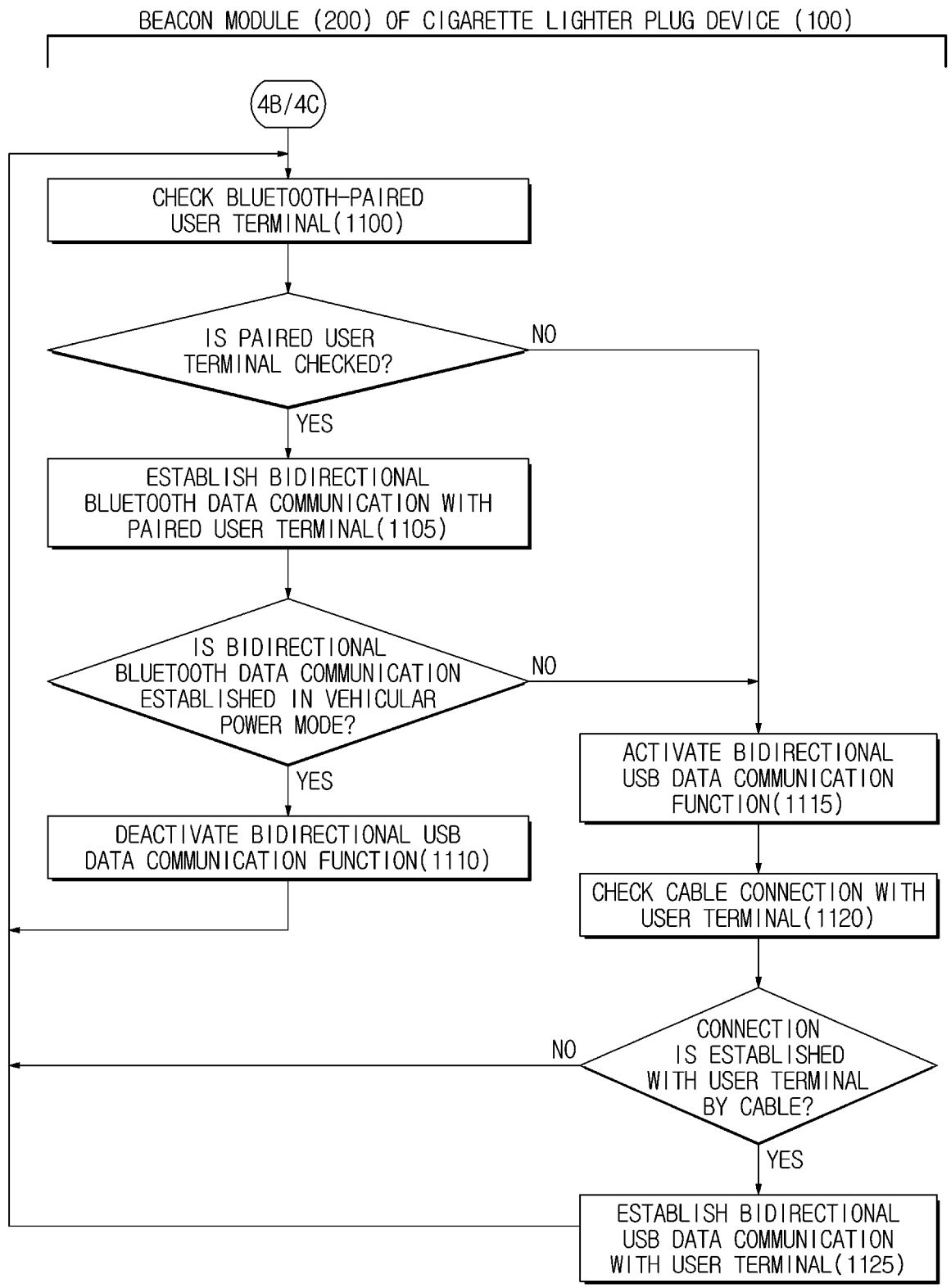
FIG. 11 is a diagram showing a process of selectively activating/deactivating a bidirectional USB data communication function of a beacon module according to an embodiment of the present invention.

FIG. 11 is a diagram showing a process of selectively activating/deactivating a bidirectional USB data communication function of the beacon module 200 according to an embodiment of the present invention.

Specifically, FIG. 11 shows a process of selectively activating or deactivating a bidirectional USB data communication function of the beacon module 200 according to a power supply state of the beacon module 200 and depending on whether bidirectional Bluetooth data communication is possible. Various embodiments of the process of activating/deactivating a bidirectional USB data communication function of the beacon module 200 (e.g., an embodiment in which some steps are omitted or steps are performed in a different order) can be readily inferred by those skilled in the art referencing and/or modifying FIG. 11. However, the present invention is intended to cover all of the inferred embodiments, and technical features thereof are not limited to only the embodiment shown in FIG. 11.

Referring to FIG. 11, when the operation mode of the beacon module 200 is set to or confirmed as one of the vehicular power mode and the charged power mode through the process shown in FIG. 4, first, the beacon module 200 performs a procedure of confirming a Bluetooth-paired user terminal 300 (1100). When the paired user terminal 300 is confirmed, the beacon module 200 establishes bidirectional Bluetooth data communication with the paired user terminal 300 (1105). When the operation mode of the beacon module 200 is the vehicular power mode while or after the bidirectional Bluetooth data communication is established with the user terminal 300, that is, when the bidirectional Bluetooth data communication is established in the vehicular power mode, the beacon module 200 deactivates the bidirectional USB data communication function (1110).

When the paired user terminal 300 is not confirmed (e.g., when the paired user terminal 300 goes beyond a bidirectional Bluetooth data communication range or when a Bluetooth function of the user terminal 300 is deactivated) or when bidirectional Bluetooth data communication is established with the paired user terminal 300 but the operation mode is not the vehicular power mode, the beacon module 200 activates the bidirectional USB data communication function (1115) and checks whether the cigarette lighter plug device 100 is connected with the user terminal 300 through the USB connector unit 125 of the cigarette lighter plug device 100 by cable (1120). When the cigarette lighter plug device 100 is connected with the user terminal 300 by cable, the beacon module 200 establishes the bidirectional USB data communication with the user terminal 300 (1125).

(Description of the Symbols)

| | |
|---|---|
| 100: cigarette lighter plug device | 105: body insertion unit |
| 110: terminal | 115: power supply unit |
| 120: power conversion unit | 125: USB connector unit |
| 130: power charging unit | 200: beacon module |
| 204: USB communication unit | 208: memory unit |
| 212: RF processing unit | 216: antenna unit |
| 224: terminal registration unit | 228: terminal authentication unit |
| 232: PIN registration unit | 236: PIN authentication unit |
| 240: communication processing unit | 244: module authentication processing unit |
| 248: information storage unit | 252: seed storage unit |
| 256: seed determination unit | 260: code generation unit |
| 264: beacon transmission unit | 268: power check unit |
| 272: mode setting unit | 276: signal control unit |
| 280: USB control unit | 284: transmission control unit |
| 300: user terminal | 325: program |
| 330: communication establishment unit | 335: PIN authentication procedure unit |
| 340: terminal authentication procedure unit | 345: module authentication procedure unit |
| 350: information generation unit | 355: communication procedure unit |
| 360: signal determination unit | 365: information output unit |

The invention claimed is:

1. A beacon module comprises:
a RF processor configured to perform RF processing to broadcast a beacon signal;
a memory having a default memory region configured to store a set of data for broadcasting a default beacon signal and a use-specific memory region configured to store a set of data for broadcasting a use-specific beacon signal through a user terminal; and
a controller configured to control the RF processor to broadcast the default beacon signal or the use-specific beacon signal,
wherein the controller is further configured to:
receive setting information for selectively broadcasting of the use-specific beacon signal from the user terminal through a bidirectional data communication; and
control the RF processor to broadcast the use-specific beacon signal corresponding to the setting information.

2. The beacon module of claim 1, wherein the controller is further configured to:
store unique information to be broadcast through the default beacon signal in the default memory region; and
control the RF processor to broadcast the default beacon signal including the unique information stored in the default memory region.

3. The beacon module of claim 1, wherein the controller is further configured to:
store one or more static seed values for generating a disposable code to be broadcast through the default beacon signal in the default memory region;
determine at least one dynamic seed value for generating the disposable code;
dynamically generate the disposable code by applying the one or more static seed values and the at least one dynamic seed value to a designated code generation algorithm; and
control the RF processor to broadcast the default beacon signal including the disposable code.

4. The beacon module of claim 1, wherein the controller is further configured to:
store unique information to be broadcast through the default beacon signal in the default memory region;
store one or more static seed values for generating a disposable code to be broadcast through the default beacon signal in the default memory region;
determine at least one dynamic seed value for generating the disposable code;
dynamically generate the disposable code by applying the one or more static seed values and the at least one dynamic seed value to a designated code generation algorithm; and
control the RF processor to broadcast the default beacon signal including the unique information of the default memory region and the disposable code.

5. The beacon module of claim 1, wherein the setting information includes at least one of unique information to be included in the use-specific beacon signal, a seed value for generating a disposable code to be included in the use-specific beacon signal, and a protocol structure of the use-specific beacon signal.

6. The beacon module of claim 1, wherein the controller is further configured to:
store unique information included in the setting information in the use-specific memory region; and
control the RF processor to broadcast the use-specific beacon signal including the unique information stored in the use-specific memory region.

7. The beacon module of claim 1, wherein the controller is further configured to:
store one or more seed values included in the setting information in the use-specific memory region;
determine one or more seed values for generating a disposable code;
dynamically generate the disposable code by applying the one or more seed values to a designated code generation algorithm; and
control the RF processor to broadcast the use-specific beacon signal including the disposable code.

8. The beacon module of claim 1, wherein the controller is further configured to:
store unique information included in the setting information in the use-specific memory region;
store one or more seed values included in the setting information in the use-specific memory region;
determine one or more seed values for generating a disposable code;
dynamically generate the disposable code by applying the one or more seed values to a designated code generation algorithm; and
control the RF processor to broadcast the use-specific beacon signal including the unique information stored in the use-specific memory region and the generated disposable code.

9. The beacon module of claim 1, wherein the controller is further configured to determine whether to broadcast the use-specific beacon signal according to a control command of the user terminal with which the bidirectional data communication is established.

10. The beacon module of claim 1, wherein the controller is further configured to determine whether to broadcast the use-specific beacon signal based on whether USB connection is established or released between the beacon module and the user terminal while valid setting information is stored in the use-specific memory region.

11. The beacon module of claim 1, wherein the controller is further configured to determine whether to broadcast the use-specific beacon signal based on whether the bidirectional Bluetooth data communication with the user terminal is possible or not while valid setting information is stored in the use-specific memory region.

12. The beacon module of claim 1, wherein the controller is further configured to:
control the RF processor to broadcast the use-specific beacon signal when valid setting information is stored in the use-specific memory region, and
control the RF processor not to broadcast the use-specific beacon signal when a designated validity time elapses or when a specific signal is received from the user terminal.

13. The beacon module of claim 1, wherein the controller is further configured to provide beacon transmission information indicating which of the default beacon signal or the use-specific beacon signal is being broadcast to the user terminal through the bidirectional data communication.

14. The beacon module of claim 1, further comprises a USB communicator configured to process USB-based data communication.

15. The beacon module of claim 14, wherein the controller is further configured to deactivate USB-based data communication when bidirectional Bluetooth data communication is established with the user terminal.

* * * * *